(12) United States Patent
Asanuma et al.

(10) Patent No.: US 11,623,985 B2
(45) Date of Patent: Apr. 11, 2023

(54) POLYVINYL ACETAL RESIN FILM AND FILM ROLL THEREOF, AND LAMINATE COMPRISING SAME

(71) Applicant: KURARAY CO., LTD., Kurashiki (JP)

(72) Inventors: Yoshiaki Asanuma, Kurashiki (JP); Koichiro Isoue, Kurashiki (JP)

(73) Assignee: KURARAY EUROPE GmbH, Hattersheim am Main (DE)

( * ) Notice: Subject to any disclaimer, the term of this patent is extended or adjusted under 35 U.S.C. 154(b) by 198 days.

(21) Appl. No.: 17/279,427

(22) PCT Filed: Sep. 25, 2019

(86) PCT No.: PCT/JP2019/037645
§ 371 (c)(1),
(2) Date: Mar. 24, 2021

(87) PCT Pub. No.: WO2020/067184
PCT Pub. Date: Apr. 2, 2020

(65) Prior Publication Data
US 2021/0403697 A1   Dec. 30, 2021

(30) Foreign Application Priority Data

Sep. 26, 2018   (JP) .............................. JP2018-180929

(51) Int. Cl.
| | | |
|---|---|---|
| *B32B 3/26* | (2006.01) | |
| *C08L 29/14* | (2006.01) | |
| *B32B 17/10* | (2006.01) | |
| *B29C 48/00* | (2019.01) | |
| *C08J 5/18* | (2006.01) | |
| *B32B 3/30* | (2006.01) | |
| *B29K 29/00* | (2006.01) | |

(52) U.S. Cl.
CPC ............ *C08L 29/14* (2013.01); *B29C 48/022* (2019.02); *B32B 3/263* (2013.01); *B32B 3/30* (2013.01); *B32B 17/10* (2013.01); *B32B 17/1022* (2013.01); *B32B 17/10036* (2013.01); *B32B 17/10605* (2013.01); *B32B 17/10761* (2013.01); *C08J 5/18* (2013.01); *B29K 2029/14* (2013.01); *B32B 2307/102* (2013.01); *B32B 2307/202* (2013.01); *B32B 2307/412* (2013.01); *B32B 2605/006* (2013.01)

(58) Field of Classification Search
CPC ....... C08L 29/14; B29C 48/022; B32B 3/263; B32B 3/30; B32B 17/10; B32B 17/10036; B32B 17/1022; B32B 17/10605; B32B 17/10761; B32B 2307/102; B32B 2307/202; B32B 2307/412; B32B 2605/006; C08J 5/18; B29K 2029/14

USPC ......................................... 428/156, 212, 213
See application file for complete search history.

(56) References Cited

U.S. PATENT DOCUMENTS

| 4,671,913 A | 6/1987 | Gen et al. |
|---|---|---|
| 2016/0288459 A1 | 10/2016 | Keller et al. |
| 2020/0023620 A1 | 1/2020 | Isoue et al. |

FOREIGN PATENT DOCUMENTS

| JP | 61-61835 A1 | 3/1986 |
|---|---|---|
| JP | 6-210729 A | 8/1994 |
| JP | 2000-290046 A | 10/2000 |
| JP | 2004-155110 A | 6/2004 |
| JP | 2011-152693 A | 8/2011 |
| JP | 2016-539905 A | 12/2016 |
| WO | WO 2015/019445 A1 | 2/2015 |
| WO | WO 2015/019452 A1 | 2/2015 |
| WO | WO 2018/181386 A1 | 10/2018 |

OTHER PUBLICATIONS

International Search Report dated Nov. 12, 2019 in PCT/JP2019/037645, 2 pages.
International Preliminary Report on Patentability and Written Opinion of the International Searching Authority dated Mar. 23, 2021 in PCT/JP2019/037645 (submitting English translation only), 9 pages.

*Primary Examiner* — Megha M Gaitonde
(74) *Attorney, Agent, or Firm* — Oblon, McClelland, Maier & Neustadt, L.L.P.

(57) ABSTRACT

The present invention relates to a polyvinyl acetal resin film, comprising a polyvinyl acetal resin material,
wherein
the polyvinyl acetal resin film has a thickness of 5 to 350 µm, and satisfies the following Formulae (1) and (2) where, comparing one surface and the other surface, a mean value of the 10-point average roughness of a rougher surface A and a mean value of the 10-point average roughness of a smoother surface B are defined as Rz1(a) µm and Rz2(a) µm, respectively:

$$Rz1(a) > 1.1 \times Rz2(a) \quad (1)$$

$$3 > Rz2(a) \quad (2),$$

a value obtained by dividing the standard deviation of the 10-point average roughness of the surface A by Rz1(a) and a value obtained by dividing the standard deviation of the 10-point average roughness of the surface B by Rz2(a) are each 0 to 0.30,
a viscosity of a toluene/ethanol (1:1, mass ratio) solution containing 10%-by-mass of a polyvinyl acetal resin contained in the polyvinyl acetal resin material, which is measured at 20° C. and 30 rpm using a Brookfield-type (B-type) viscometer, is 100 to 1,000 mPa·s, and
the amount of a plasticizer in the polyvinyl acetal resin film is 0 to 20% by mass based on a total mass of the polyvinyl acetal resin film.

20 Claims, No Drawings

POLYVINYL ACETAL RESIN FILM AND FILM ROLL THEREOF, AND LAMINATE COMPRISING SAME

TECHNICAL FIELD

The present invention relates to a polyvinyl acetal resin film and a film roll thereof, as well as a laminate comprising the polyvinyl acetal resin film.

BACKGROUND ART

Films formed of a polyvinyl acetal resin are widely used as intermediate films of laminated glasses for various vehicles and buildings because of their excellent transparency, flexibility, shock absorption, adhesion with glass, and the like. Generally, from the viewpoint of the ease of handling, such films are often stored in a state of being wound on a core material in the form of a roll; however, there is a problem that adjacent films strongly adhere with each other during storage and the films are likely to self-adhere with one another over time. For the inhibition of such self-adhesion in a film roll, for example, an intermediate film for laminated glasses, which is formed of a plasticized polyvinyl acetal resin layer or sheet provided with fine irregularities on both sides by embossing or the like, has been proposed (Patent Document 1).

PRIOR ART DOCUMENT

Patent Document

[Patent Document 1] Japanese Laid-Open Patent Publication No. 2000-290046

SUMMARY OF THE INVENTION

Problems to be Solved by the Invention

However, even in a resin film having fine irregularities formed on both sides as described in Patent Document 1, since both sides have similar surface profiles, the irregularities on one side of the resin film are likely to be interdigitated with the irregularities on the other side when the resin film is wound into the form of a roll. As a result, after all, the adhesion between adjacent resin films tends to be increased, and this causes such problems that film breakage easily occurs at the time of unwinding, and the film surface becomes heterogeneous due to, for example, formation of irregularities on the film surface at the time of unwinding; therefore, the effect of inhibiting self-adhesion during storage was not necessarily satisfactory. Particularly, since self-adhesion is more likely to occur during storage, transport and delivery of a film roll when the film roll is likely to be put under a high-temperature environment, there is a demand for a resin film which exhibits an excellent self-adhesion inhibiting effect in a wide temperature range, especially under a high-temperature environment.

In view of the above, an object of the present invention is to provide a polyvinyl acetal resin film which not only hardly causes self-adhesion of a film roll over time when wound into the form of a roll and exhibits an excellent self-adhesion inhibiting effect even when exposed to a high-temperature environment in particular, but also has a uniform surface when unwound from the roll.

Means for Solving Problems

The present inventors intensively studied to solve the above-described problems, thereby completing the present invention. That is, the present invention provides the following preferred embodiments.

[1] A polyvinyl acetal resin film, comprising a polyvinyl acetal resin material,
wherein
the polyvinyl acetal resin film has a thickness of 5 to 350 μm, and satisfies the following Formulae (1) and (2) where, comparing one surface and the other surface, a mean value of the 10-point average roughness of a rougher surface A and a mean value of the 10-point average roughness of a smoother surface B are defined as $Rz1(a)$ μm and $Rz2(a)$ μm, respectively:

$$Rz1(a) > 1.1 \times Rz2(a) \quad (1)$$

$$3 > Rz2(a) \quad (2),$$

a value obtained by dividing the standard deviation of the 10-point average roughness of the surface A by $Rz1(a)$ and a value obtained by dividing the standard deviation of the 10-point average roughness of the surface B by $Rz2(a)$ are each 0 to 0.30,
a viscosity of a toluene/ethanol (1:1, mass ratio) solution containing 10%-by-mass of a polyvinyl acetal resin contained in the polyvinyl acetal resin material, which is measured at 20° C. and 30 rpm using a Brookfield-type (B-type) viscometer, is 100 to 1,000 mPa·s, and
the amount of a plasticizer in the polyvinyl acetal resin film is 0 to 20% by mass based on a total mass of the polyvinyl acetal resin film.

[2] The polyvinyl acetal resin film according to [1], further satisfying the following Formula (3):

$$Rz1(a) < 5 \quad (3).$$

[3] The polyvinyl acetal resin film according to [1] or [2], satisfying the following Formulae (4), (5) and (6) where the mean value of the 10-point average roughness of the surface A and the mean value of the 10-point average roughness of the surface B after the polyvinyl acetal resin film is maintained at 50° C. for 30 minutes are defined as $Rz1(b)$ μm and $Rz2(b)$ μm, respectively:

$$0.7 \times Rz1(a) \leq Rz1(b) \leq 1.3 \times Rz1(a) \quad (4)$$

$$0.7 \times Rz2(a) \leq Rz2(b) \leq 1.3 \times Rz2(a) \quad (5)$$

$$Rz1(b) > Rz2(b) \quad (6).$$

[4] The polyvinyl acetal resin film according to any one of [1] to [3], wherein the viscosity of the toluene/ethanol (1:1, mass ratio) solution containing 10%-by-mass of the polyvinyl acetal resin contained in the polyvinyl acetal resin material, which is measured at 20° C. and 30 rpm using a Brookfield-type (B-type) viscometer, is 300 mPa·s or lower.

[5] The polyvinyl acetal resin film according to any one of [1] to [4], wherein the viscosity of the toluene/ethanol (1:1, mass ratio) solution containing 10%-by-mass of the polyvinyl acetal resin contained in the polyvinyl acetal resin material, which is measured at 20° C. and 30 rpm using a Brookfield-type (B-type) viscometer, is higher than 200 mPa·s.

[6] The polyvinyl acetal resin film according to any one of [1] to [5], wherein the polyvinyl acetal resin in the polyvinyl acetal resin material has a molecular weight distribution of 2.7 or higher.

[7] The polyvinyl acetal resin film according to any one of [1] to [6], wherein the polyvinyl acetal resin in the polyvinyl acetal resin material is a mixture of at least two polyvinyl acetal resins having different viscosity-average polymerization degrees, or an acetalized product of a mixture of at least two polyvinyl alcohol-based resins having different viscosity-average polymerization degrees.

[8] A polyvinyl acetal resin film roll, comprising the polyvinyl acetal resin film according to any one of [1] to [7] which is wound such that the surface A side is on the inside.

[9] A polyvinyl acetal resin film roll, comprising the polyvinyl acetal resin film according to any one of [1] to [7] which is wound such that the surface A side is on the outside.

[10] A method of storing a polyvinyl acetal resin film roll, the method comprising storing the polyvinyl acetal resin film roll according to [8] or [9] at a temperature of −20° C. to 60° C.

[11] A functional layer-equipped polyvinyl acetal resin film, comprising a functional layer on at least one surface of the polyvinyl acetal resin film according to any one of [1] to [7].

[12] The functional layer-equipped polyvinyl acetal resin film according to [11], wherein the functional layer is a conductive layer.

[13] The functional layer-equipped polyvinyl acetal resin film according to [12], wherein a material constituting the conductive layer comprises silver or copper.

[14] The functional layer-equipped polyvinyl acetal resin film according to [12] or [13], wherein the conductive layer comprises plural linear conductive materials having a line width of 1 to 30 μm.

[15] A method of producing the functional layer-equipped polyvinyl acetal resin film according to any one of [11] to [14], the method comprising coating, printing, or laminating a material constituting the functional layer on at least one surface of the polyvinyl acetal resin film.

[16] A laminate, comprising:
a transparent substrate; and
the polyvinyl acetal resin film according to any one of [1] to [7], or the functional layer-equipped polyvinyl acetal resin film according to any one of [11] to [15].

[17] A laminate, comprising the polyvinyl acetal resin film according to any one of [1] to [7], or the functional layer-equipped polyvinyl acetal resin film according to any one of [11] to [15], between plural transparent substrates.

[18] The laminate according to [16] or [17], further comprising a plasticized polyvinyl acetal resin layer.

[19] The laminate according to any one of [16] to [18], wherein the transparent substrate is a glass.

[20] A glass for a vehicle, comprising the laminate according to any one of [16] to [19].

Effects of the Invention

According to the present invention, a polyvinyl acetal resin film which not only hardly causes self-adhesion of a film roll over time when wound into the form of a roll and exhibits an excellent self-adhesion inhibiting effect even when exposed to a high-temperature environment in particular, but also has a uniform surface when unwound from the roll, can be provided.

MODE FOR CARRYING OUT THE INVENTION

Embodiments of the present invention will now be described in detail; however, the present invention is not restricted thereto.

<Polyvinyl Acetal Resin Film>

The polyvinyl acetal resin film of the present invention satisfies the following Formulae (1) and (2) where, comparing one surface and the other surface, a mean value of the 10-point average roughness of a rougher surface A and a mean value of the 10-point average roughness of a smoother surface B are defined as $Rz1(a)$ μm and $Rz2(a)$ μm, respectively:

$$Rz1(a) > 1.1 \times Rz2(a) \tag{1}$$

$$3 > Rz2(a) \tag{2},\text{ and}$$

a value obtained by dividing the standard deviation of the 10-point average roughness of the surface A by $Rz1(a)$ and a value obtained by dividing the standard deviation of the 10-point average roughness of the surface B by $Rz2(a)$ are each 0 to 0.30. A conventional polyvinyl acetal resin film used as an intermediate film for a laminated glass generally has the same surface profile on both surfaces; however, in the polyvinyl acetal resin film of the present invention, one surface thereof and the other surface have different surface profiles from each other. As a result, when the elongated film is wound into the form of a roll after its formation, fine voids are generated between one surface and the other surface of adjacent resin films, and the adhesion between these films is thereby appropriately reduced, so that self-adhesion over time can be inhibited. In addition, since the generation of roll wrinkles caused by self-adhesion of the films and entrapment of air can be inhibited, a film roll having a uniform surface at the time of unwinding can be obtained. Moreover, if parts having the same profile (the same degree of roughness) partially exist on the surfaces of films that are superimposed with one another when the resin film is wound into the form of a roll, self-adhesion is likely to occur in such parts; therefore, in the resin film of the present invention, the surface profiles of the respective surfaces are controlled to be uniform, whereby a polyvinyl acetal resin film which exhibits a high self-adhesion inhibiting effect even when exposed to a high-temperature environment where self-adhesion relatively easily occurs can be obtained.

In the polyvinyl acetal resin film of the present invention, the "mean value of the 10-point average roughness" refers to a mean value of the 10-point average roughness measured at arbitrary five spots selected on each surface such that the measurement directions are parallel to each other and the measurement spots are at least 3 cm away from one another. Particularly, in a case where the polyvinyl acetal resin film of the present invention is produced by a continuous process such as extrusion molding, the direction of measuring the 10-point average roughness is the same as the molding direction (film longitudinal direction) in the extrusion molding or the like and, when the width of the polyvinyl acetal resin film exceeds 50 cm, the mean value of the 10-point average roughness is determined by performing the measurement at five spots, which are positioned at 17±2%, 34±2%, 50±2%, 67±2%, and 83±2% of the width from one widthwise end of the polyvinyl acetal resin film. The 10-point average roughness of each resin film surface can be measured in accordance with JIS B0601-1994 using a surface roughness meter or a laser microscope. The measurement is preferably performed using a contact-type surface roughness meter. Specifically, the 10-point average roughness can be measured by the method described below in the section of Examples.

In the polyvinyl acetal resin film of the present invention, $Rz1(a)$ and $Rz2(a)$ satisfy the following Formula (1):

$$Rz1(a) > 1.1 \times Rz2(a) \tag{1}$$

When $Rz1(a)$ is $1.1 \times Rz2(a)$ or less, one surface of the resin film and the other surface have similar surface profiles with each other, and appropriate voids are hardly formed between adjacent film surfaces at the time of winding the resin film into the form of a roll; therefore, self-adhesion is unlikely to be inhibited, and this can cause a heterogeneous film surface to be generated when the resin film is unwound. For example, when a functional layer such as a conductive layer is arranged on the resin film, a heterogeneous film surface makes deformation and breakage of the functional layer more likely to occur during the process thereof or after lamination. In the present invention, Rz1(a) is preferably not less than 1.3×Rz2(a), more preferably not less than 1.5×Rz2(a), still more preferably not less than 1.8×Rz2(a), particularly preferably not less than 2×Rz2(a). From the viewpoint of inhibiting self-adhesion, Rz1(a) may be any value as long as it is larger than 1.1 times of Rz2(a); therefore, an upper limit of the coefficient in the above-described relationship is not particularly restricted, and the difference between Rz1(a) and Rz2(a) may be in any relationship as long as it is not greater than the thickness of the polyvinyl acetal resin film. However, when Rz2(a) is larger than 0 µm, Rz1(a) is usually not larger than 1,000×Rz2(a). It is noted here that Rz1(a) and Rz2(a) are measured at room temperature.

The polyvinyl acetal resin film of the present invention satisfies the following Formula (2):

$$3 > Rz2(a) \tag{2}$$

That is, the mean value of the 10-point average roughness of the surface B, which is a smoother surface of the polyvinyl acetal resin film of the present invention, is less than 3 µm. With the surface roughness of the smoother surface B being 3 µm or higher, both surfaces of the resin film are relatively rough surfaces and, for example, when a functional layer such as a conductive layer is arranged on the resin film, deformation and breakage of the functional layer is more likely to occur during the process thereof or after lamination. Rz2(a) is preferably less than 2.5 µm, more preferably less than 2 µm, still more preferably less than 1.5 µm, particularly preferably less than 1 µm. When Rz2(a) is not larger than this upper limit, a high self-adhesion inhibiting effect is likely to be obtained. In addition, by winding the resin film such that the side of the surface B having such a mean value of the 10-point average roughness is on the outside of the resulting roll, foreign matters such as debris and dust are made unlikely to adhere thereto during storage, transport, delivery and the like. Conversely, by winding the resin film such that the surface B is on the inside of the resulting roll, it is made easy to remove foreign matters such as debris and dust even if they adhere to the resin film. Therefore, the polyvinyl acetal resin film of the present invention is also advantageous in that the working efficiency can be improved by selecting the roll winding direction in accordance with, for example, the environment to which the resulting film roll is exposed. For example, when a functional layer such as a conductive layer is arranged on the resin film, from the viewpoint of making it easier to inhibit deformation and breakage of the functional layer by laminating it on the side of the smoother surface B, a lower limit of Rz2(a) is not particularly restricted, and may be 0 µm.

The polyvinyl acetal resin film of the present invention preferably satisfies the following Formula (3):

$$Rz1(a) < 5 \tag{3}$$

That is, the mean value Rz1(a) of the 10-point average roughness of the surface A, which is a rougher surface of the polyvinyl acetal resin film of the present invention, is less than 5 µm. When an upper limit of Rz1(a) is less than 5 µm, since the surface roughness of the surface A is not excessively high, appropriate voids are likely to be generated when the surface A is brought into contact with the smoother surface B, and a high self-adhesion inhibiting effect is thus likely to be obtained. This is also advantageous in that, for example, in the production of a laminate by laminating a transparent substrate such as a glass on the resin film, foam entrapment in the resulting laminate can be easily and effectively inhibited by laminating the transparent substrate on the side of the rougher surface A. Rz1(a) is more preferably 4.5 µm or less, still more preferably 4 µm or less. Meanwhile, Rz1(a) is preferably not less than 0.8 µm, more preferably not less than 1 µm, still more preferably not less than 1.5 µm, particularly preferably not less than 2 µm. When the surface roughness of the rougher surface A is not less than this lower limit, appropriate voids are likely to be generated when the surface A is brought into contact with the smoother surface B, and a high self-adhesion inhibiting effect is thus likely to be obtained. In addition, by winding the resin film such that the side of the surface A having such a mean value of the 10-point average roughness is on the inside of the resulting roll, foreign matters such as debris and dust are made unlikely to adhere thereto during storage, transport, delivery and the like. Conversely, by winding the resin film such that the surface A is on the outside of the resulting roll, it is made easy to remove foreign matters such as debris and dust even if they adhere to the resin film. Therefore, the polyvinyl acetal resin film of the present invention is also advantageous in that the working efficiency can be improved by selecting the roll winding direction in accordance with, for example, the environment to which the resulting film roll is exposed.

In the polyvinyl acetal resin film of the present invention, a value obtained by dividing the standard deviation of the 10-point average roughness of the surface A by Rz1(a) and a value obtained by dividing the standard deviation of the 10-point average roughness of the surface B by Rz2(a) are each 0 to 0.30. The values obtained by dividing the standard deviation of the 10-point average roughness of each surface by Rz1(a) or Rz2(a) can be an index that represents the uniformity of the surface roughness of each surface and, when these values are in the above-described range, each surface of the resin film tends to have a uniform surface profile. In this case, the possibility for those parts having the same profile (the same degree of roughness) to partially exist on the surfaces of films that are superimposed with one another when the resin film is wound into the form of a roll is reduced, so that self-adhesion in such parts caused by interdigitation of the irregularities of the surface A with the irregularities of the surface B, which surfaces have similar profiles, can be inhibited. In the polyvinyl acetal resin film of the present invention, by controlling the uniformity of the surface profile of each surface in this manner, a high self-adhesion inhibiting effect can be obtained even when the resin film is exposed to a high-temperature environment where self-adhesion relatively easily occurs. The value obtained by dividing the standard deviation of the 10-point average roughness of the surface A by Rz1(a) and the value obtained by dividing the standard deviation of the 10-point average roughness of the surface B by Rz2(a) are each preferably 0.25 or less, more preferably 0.2 or less, and their ideal lower limit values are 0; however, these values may each be, for example, 0.01 or larger.

In the present invention, the mean values Rz1(a) and Rz2(a) of the 10-point average roughness of the polyvinyl acetal resin film can each be adjusted by, for example, controlling the surface profile and the material of a roll used in the formation of the film from a polyvinyl acetal resin material by a melt-extrusion method, controlling the press pressure in melt-extrusion molding, and/or controlling the embossing conditions (e.g., resin film temperature and roll surface temperature). Further, the values obtained by dividing the standard deviation of the 10-point average roughness of each surface by Rz1(a) or Rz2(a) can also be adjusted by, for example, controlling the surface profile and the material of a roll used in the formation of the film from a polyvinyl acetal resin material by a melt-extrusion method, controlling the press pressure in melt-extrusion molding, and/or controlling the embossing conditions (e.g., resin film temperature and roll surface temperature).

The polyvinyl acetal resin film of the present invention preferably satisfies the following Formulae (4), (5) and (6) where the mean value of the 10-point average roughness of the surface A and the mean value of the 10-point average roughness of the surface B after the polyvinyl acetal resin film is maintained at 50° C. for 30 minutes are defined as Rz1(b) μm and Rz2(b) μm, respectively:

$$0.7 \times Rz1(a) \leq Rz1(b) \leq 1.3 \times Rz1(a) \quad (4)$$

$$0.7 \times Rz2(a) \leq Rz2(b) \leq 1.3 \times Rz2(a) \quad (5)$$

$$Rz1(b) > Rz2(b) \quad (6).$$

By satisfying the above Formulae (4), (5) and (6), a high self-adhesion inhibiting effect can be obtained even when the resin film is exposed to a high-temperature environment where self-adhesion relatively easily occurs.

Rz1(b) and Rz2(b) each preferably have a smaller change as compared to Rz1(a) and Rz2(a) which are the mean values of the surface roughness before heating (under room temperature), and more preferably satisfy the followings:

$$0.8 \times Rz1(a) \leq Rz1(b) \leq 1.2 \times Rz1(a) \quad (7)$$

$$0.8 \times Rz2(a) \leq Rz2(b) \leq 1.2 \times Rz2(a) \quad (8)$$

Further, the polyvinyl acetal resin film of the present invention preferably shows a smaller post-heating change in a wide temperature range as compared to Rz1(a) and Rz2(a) which are the mean values of the surface roughness under room temperature. For example, the polyvinyl acetal resin film of the present invention preferably satisfies the following Formulae (9), (10) and (11) where the mean value of the 10-point average roughness of the surface A and the mean value of the 10-point average roughness of the surface B after the polyvinyl acetal resin film is maintained at 60° C. for 30 minutes are defined as Rz1(c) μm and Rz2(c) μm, respectively:

$$0.7 \times Rz1(a) \leq Rz1(c) \leq 1.3 \times Rz1(a) \quad (9)$$

$$0.7 \times Rz2(a) \leq Rz2(c) \leq 1.3 \times Rz2(a) \quad (10)$$

$$Rz1(c) > Rz2(c) \quad (11).$$

In the present invention, a polyvinyl acetal resin film satisfying the above-described Formulae (4) to (11) can be obtained by, for example, controlling the surface roughness and the uniformity of each surface, adjusting the formulation of the polyvinyl acetal resin material constituting the polyvinyl acetal resin film, controlling the press pressure in melt-extrusion molding, and/or controlling the embossing conditions (e.g., resin film temperature and roll surface temperature).

The polyvinyl acetal resin film of the present invention has a thickness of 5 to 350 μm. When the thickness is less than 5 μm, shrinkage and deformation of the polyvinyl acetal resin film are likely to occur. Meanwhile, with the thickness being greater than 350 μm, when a plasticized polyvinyl acetal resin layer is bonded adjacent to the polyvinyl acetal resin film of the present invention, the amount of a plasticizer migrating from the plasticized polyvinyl acetal resin layer to the polyvinyl acetal resin film of the present invention is increased; therefore, the penetration resistance of the resulting laminate is likely to be reduced, and this makes it difficult to obtain, for example, a sufficient effect of reducing the head impact on collision when the laminate is used as a vehicle glass. The thickness of the polyvinyl acetal resin film is preferably 10 μm or greater, more preferably 20 μm or greater, still more preferably 30 μm or greater, but preferably 330 μm or less, more preferably 295 μm or less, still more preferably 270 μm or less, particularly preferably 250 μm or less, yet still more preferably 150 μm or less, particularly more preferably 120 μm or less, most preferably less than 100 μm. When the thickness of the polyvinyl acetal resin film is in a range of from the above-described lower limit value to the above-described upper limit value, the above-described problems hardly occur, and good film-forming property is likely to be obtained.

The thickness of the polyvinyl acetal resin film can be measured by using, for example, a thickness gauge or a laser microscope.

(Polyvinyl Acetal Resin)

The polyvinyl acetal resin film of the present invention comprises a polyvinyl acetal resin material comprising a polyvinyl acetal resin. The polyvinyl acetal resin is a resin produced by acetalization of a polyvinyl alcohol or a polyvinyl alcohol-based resin such as an ethylene-vinyl alcohol copolymer. It is noted here that the term "polyvinyl acetal resin material" used in the present invention encompasses both a material composed of a polyvinyl acetal resin and a material composed of a resin composition containing a polyvinyl acetal resin.

In the present invention, the polyvinyl acetal resin in the polyvinyl acetal resin film may comprise one polyvinyl acetal resin, or two or more polyvinyl acetal resins that are different in at least one of viscosity-average polymerization degree, acetalization degree, vinyl acetate unit content, vinyl alcohol unit content, ethylene unit content, molecular weight of aldehyde used for acetalization, and chain length. When the polyvinyl acetal resin film comprises two or more different polyvinyl acetal resins, from the viewpoint of the ease of melt molding and the viewpoint of preventing deformation of a functional layer or the like arranged on a laminated glass as well as misalignment and the like of a glass during the use of the laminated glass, it is preferred that the polyvinyl acetal resin be a mixture of at least two polyvinyl acetal resins having different viscosity-average polymerization degrees, or an acetalized product of a mixture of at least two polyvinyl alcohol-based resins having different viscosity-average polymerization degrees.

The acetalization degree of the polyvinyl acetal resin used in the present invention is preferably 40% by mole or higher, more preferably 45% by mole or higher, still more preferably 50% by mole or higher, yet still more preferably 60% by mole or higher, particularly preferably 68% by mole or higher, but preferably 86% by mole or lower, more preferably 84% by mole or lower, still more preferably 82% by mole or lower. Assuming that a unit comprising two carbon atoms of the main chain in a polyvinyl alcohol-based resin used as a raw material for the production of the polyvinyl acetal resin (e.g., a vinyl alcohol unit, a vinyl acetate unit, or an ethylene unit) is a single repeating unit, the acetalization degree is the amount of the above-described acetal-forming unit based on the single repeating unit. When the acetalization degree is in a range of from the above-described lower limit value to the above-described upper limit value, the resulting polyvinyl acetal resin film is likely to have a sufficient mechanical strength, and good compatibility is likely to be obtained between the polyvinyl acetal resin and a plasticizer, which is preferred. In cases where the polyvinyl acetal resin film contains two or more different polyvinyl acetal resins, it is preferred that the acetalization degree of at least one of the polyvinyl acetal resins be in a range of from the above-described lower limit value to the above-described upper limit value. Further, from the viewpoint of water resistance, the acetalization degree of the polyvinyl acetal resin is preferably 65% by mole or higher. The acetalization degree can be adjusted by controlling the amount of an aldehyde used in the acetalization reaction.

The vinyl acetate unit content of the polyvinyl acetal resin is preferably 0.1% by mole or higher, more preferably 0.3% by mole or higher, still more preferably 0.5% by mole or higher, but preferably 30% by mole or less, more preferably 20% by mole or less, and particularly preferably 0.5 to 3% by mole, or 5 to 8% by mole. Assuming that a unit comprising two carbon atoms of the main chain in a polyvinyl alcohol-based resin used as a raw material for the production of the polyvinyl acetal resin (e.g., a vinyl alcohol unit, a vinyl acetate unit, or an ethylene unit) is a single repeating unit, the vinyl acetate unit content is the amount of vinyl acetate units based on the single repeating unit. The vinyl acetate unit content can affect the polarity of the polyvinyl acetal resin, which may lead to a change in the plasticizer compatibility or the mechanical strength of the polyvinyl acetal resin film. When the vinyl acetate unit content is in a range of from the above-described lower limit value to the above-described upper limit value, for example, good bonding of the polyvinyl acetal resin film with a plasticized polyvinyl acetal resin layer optionally laminated adjacent thereto, as well as a reduction in optical distortion are likely to be achieved. In cases where the polyvinyl acetal resin film contains two or more different polyvinyl acetal resins, it is preferred that the vinyl acetate unit content of at least one of the polyvinyl acetal resins be in the above-described range. The vinyl acetate unit content can be adjusted by appropriately controlling the saponification degree of the polyvinyl alcohol-based resin used as a raw material.

The vinyl alcohol unit content of the polyvinyl acetal resin is preferably 9 to 36% by mole, more preferably 18 to 34% by mole, still more preferably 22 to 34% by mole, yet still more preferably 26 to 34% by mole, particularly preferably 26 to 31% by mole, particularly more preferably 26 to 30% by mole. Assuming that a unit comprising two carbon atoms of the main chain in a polyvinyl alcohol-based resin used as a raw material for the production of the polyvinyl acetal resin (e.g., a vinyl alcohol unit, a vinyl acetate unit, or an ethylene unit) is a single repeating unit, the vinyl alcohol unit content is the amount of vinyl alcohol units based on the single repeating unit. When the vinyl alcohol unit content is in the above-described range, the difference in refractive index between the polyvinyl acetal resin film and a plasticized polyvinyl acetal resin film optionally laminated adjacent thereto is small, so that a laminated glass with little optical unevenness is likely to be obtained. In order to additionally provide sound insulation performance, the vinyl alcohol unit content is preferably 9 to 29% by mole, more preferably 12 to 26% by mole, still more preferably 15 to 23% by mole, particularly preferably 16 to 20% by mole. In cases where the polyvinyl acetal resin film contains two or more different polyvinyl acetal resins, it is preferred that the vinyl alcohol unit content of at least one of the polyvinyl acetal resins be in the above-described range. The vinyl alcohol unit content can be adjusted in the above-described range by controlling the amount of an aldehyde used in the acetalization reaction.

The polyvinyl acetal resin is usually constituted by an acetal-forming unit, a vinyl alcohol unit and a vinyl acetate unit, and the amount of each unit is determined by, for example, JIS K6728 "Testing Methods for Polyvinyl Butyral" or nuclear magnetic resonance spectroscopy (NMR).

The viscosity of a toluene/ethanol (1:1, mass ratio) solution containing 10%-by-mass of the polyvinyl acetal resin contained in the polyvinyl acetal resin material constituting the polyvinyl acetal resin film of the present invention, which is measured at 20° C. and 30 rpm using a Brookfield-type (B-type) viscometer, is 100 to 1,000 mPa·s. When the viscosity is lower than 100 mPa·s, it is difficult to ensure sufficient heat resistance in the use of the polyvinyl acetal resin film as a laminated glass, whereas when the viscosity is higher than 1,000 mPa·s, good film-forming property is unlikely to be obtained.

In one embodiment of the present invention, the viscosity of the toluene/ethanol (1:1, mass ratio) solution containing 10%-by-mass of the polyvinyl acetal resin contained in the polyvinyl acetal resin material, which is measured at 20° C. and 30 rpm using a Brookfield-type (B-type) viscometer, is preferably 300 mPa·s or lower, more preferably 250 mPa·s or lower, still more preferably 200 mPa·s or lower, particularly preferably 180 mPa·s or lower. When the viscosity is not higher than this upper limit value, the heating temperature or the heating time can be easily controlled within a desired range in the production of a laminated glass using the polyvinyl acetal resin film, and an unmelted portion of the polyvinyl acetal resin is thus less likely to remain; therefore, yellowing of the polyvinyl acetal resin film is unlikely to occur. Specific examples of a case where the above-described viscosity is preferred include a case where an inorganic layer or a resin layer that hardly allows permeation of a plasticizer therethrough, such as a functional layer comprising a polyester resin, a polyolefin resin or the like, is formed on substantially the entire surface between the polyvinyl acetal resin film and a plasticized polyvinyl acetal resin layer. In such a mode, from the viewpoint of the ease of obtaining a laminated glass without any unmelted portion of the polyvinyl acetal resin, a lower limit value of the above-described viscosity is preferably 100 mPa·s or higher, more preferably 120 mPa·s or higher, particularly preferably 150 mPa·s or higher.

In another embodiment of the present invention, the viscosity of the toluene/ethanol (1:1, mass ratio) solution containing 10%-by-mass of the polyvinyl acetal resin contained in the polyvinyl acetal resin material, which is measured at 20° C. and 30 rpm using a Brookfield-type (B-type) viscometer, is preferably higher than 200 mPa·s, more preferably 210 mPa·s or higher, still more preferably 220 mPa·s or higher, yet still more preferably 230 mPa·s or higher, particularly preferably 240 mPa·s or higher, yet still more preferably 250 mPa·s or higher, particularly more preferably 265 mPa·s or higher. When the viscosity of the polyvinyl acetal resin is not lower than this lower limit value, a laminated glass in which glass misalignment hardly occurs even at a high temperature can be easily obtained and, even in a case where, for example, a functional layer and a structure such as a conductor are laminated, deformation and breakage thereof can be sufficiently inhibited. In such a embodiment, from the viewpoint of obtaining good film-forming property, an upper limit value of the viscosity is usually 1,000 mPa·s or lower, preferably 800 mPa·s or lower, more preferably 500 mPa·s or lower, still more preferably 450 mPa·s or lower, particularly preferably 400 mPa·s or lower.

The above-described viscosity can be adjusted by using a polyvinyl acetal resin, which is produced by using a polyvinyl alcohol-based resin having a high viscosity-average polymerization degree as a raw material or a part of the raw material, singly or in combination. When the polyvinyl acetal resin used for forming the polyvinyl acetal resin film is a mixture of plural resins, the above-described viscosity is the viscosity of such a mixture.

The peak-top molecular weight of the polyvinyl acetal resin contained in the polyvinyl acetal resin material is preferably 115,000 to 200,000, more preferably 120,000 to 160,000, particularly preferably 130,000 to 150,000. When the peak-top molecular weight of the polyvinyl acetal resin is in this range, preferred film-forming property and film physical properties (e.g., lamination suitability, creep resistance, and breaking strength) are likely to be obtained. The peak-top molecular weight can be adjusted by using a polyvinyl acetal resin, which is produced by using a polyvinyl alcohol-based resin having a high viscosity-average polymerization degree as a raw material or a part of the raw material, singly or in combination.

The molecular weight distribution, i.e. a ratio (Mw/Mn) of the weight-average molecular weight (Mw) and the number-average molecular weight (Mn), of the polyvinyl acetal resin contained in the polyvinyl acetal resin material is preferably 2.7 or higher, more preferably 2.8 or higher, particularly preferably 2.9 or higher. When the molecular weight distribution of the polyvinyl acetal resin is not lower than this lower limit value, both good film-forming property and preferred film physical properties (e.g., lamination suitability, creep resistance, and breaking strength) are likely to be obtained at the same time. The molecular weight distribution can be adjusted by acetalizing a mixture of polyvinyl alcohol-based resins having different viscosity-average polymerization degrees, or by mixing acetalizated products of polyvinyl alcohol-based resins having different viscosity-average polymerization degrees. An upper limit value of the molecular weight distribution is not particularly restricted; however, from the viewpoint of the ease of film formation, it is usually 10 or lower, preferably 5 or lower.

When the polyvinyl acetal resin material comprises two or more different polyvinyl acetal resins, it is preferred that the peak-top molecular weight and the molecular weight distribution of at least one of the polyvinyl acetal resins be in the above-described respective ranges.

The peak-top molecular weight and the molecular weight distribution can be determined by, for example, gel permeation chromatography (GPC) using a polystyrene of known molecular weight as a standard.

A polyvinyl acetal resin used in the present invention can be produced by a conventionally known method, typically by acetalization of a polyvinyl alcohol-based resin (e.g., a polyvinyl alcohol resin or an ethylene-vinyl alcohol copolymer) with an aldehyde. The method is not restricted; however, specifically, for example, a 3 to 30%-by-mass aqueous solution of a polyvinyl alcohol or an ethylene-vinyl alcohol copolymer is maintained in a temperature range of 80 to 100° C. and then slowly cooled over a period of 10 to 60 minutes and, once the temperature is lowered to −10 to 30° C., an aldehyde and an acid catalyst are added, and an acetalization reaction is allowed to proceed for 30 to 300 minutes while maintaining the temperature constant. Next, the resulting reaction solution is heated to a temperature of 20 to 80° C. over a period of 30 to 200 minutes, maintained for 30 to 300 minutes, and subsequently filtered as required, after which the reaction solution is neutralized with an addition of a neutralizer such as an alkali, and the thus formed resin is filtered, washed with water, and then dried, whereby a polyvinyl acetal resin that may be used in the present invention can be produced.

The acid catalyst used in the acetalization reaction is not particularly restricted, and either an organic acid or an inorganic acid can be used. Examples of the acid catalyst include acetic acid, p-toluenesulfonic acid, nitric acid, sulfuric acid, and hydrochloric acid. Among them, from the viewpoint of the acid strength and the ease of removal by washing, hydrochloric acid, sulfuric acid, and nitric acid can be preferably used.

From the viewpoint of the ease of obtaining a polyvinyl acetal resin having a preferred breaking energy, the aldehyde or a keto compound used for the production of the polyvinyl acetal resin is preferably a linear, branched, or cyclic compound having 2 to 10 carbon atoms, more preferably a linear or branched compound. Such a compound gives an appropriate linear or branched acetal group. The polyvinyl acetal resin used in the present invention may be an acetalized product obtained by acetalizing a polyvinyl alcohol or an ethylene-vinyl alcohol copolymer with a mixture of plural aldehydes or keto compounds.

The polyvinyl acetal resin used in the present invention is preferably a polyvinyl acetal resin that is produced by a reaction between at least one polyvinyl alcohol-based resin and one or more aliphatic unbranched aldehydes having 2 to 10 carbon atoms. As such an aldehyde, from the viewpoint of the ease of obtaining a polyvinyl acetal resin having a preferred breaking energy, n-butylaldehyde is preferred. The content of n-butylaldehyde in the aldehydes used for acetalization is preferably not less than 50% by mass, more preferably not less than 80% by mass, still more preferably not less than 95% by mass, particularly preferably not less than 99% by mass, and may be 100% by mass. In a preferred embodiment of the present invention, the polyvinyl acetal resin is a polyvinyl butyral resin.

The polyvinyl alcohol-based resin used for the production of the polyvinyl acetal resin may be a single polyvinyl alcohol-based resin, or a mixture of polyvinyl alcohol-based resins having different viscosity-average polymerization degrees, hydrolysis degrees, or the like.

The viscosity-average polymerization degree of the polyvinyl alcohol-based resin used as a raw material of the polyvinyl acetal resin is preferably 100 or higher, more preferably 300 or higher, still more preferably 400 or higher, yet still more preferably 600 or higher, particularly preferably 700 or higher, particularly more preferably 750 or higher. When the viscosity-average polymerization degree of the polyvinyl alcohol-based resin is not lower than this lower limit value, deformation and breakage of a functional layer during the production of a laminated glass are likely to be inhibited, and a phenomenon of glass misalignment caused by heat can be inhibited in the resulting laminated glass. Meanwhile, the viscosity-average polymerization degree of the polyvinyl alcohol-based resin is preferably 5,000 or lower, more preferably 3,000 or lower, still more preferably 2,500 or lower, particularly preferably 2,300 or lower, particularly more preferably 2,000 or lower. When the viscosity-average polymerization degree of the polyvinyl alcohol-based resin is not higher than this upper limit value, good film-forming property is likely to be obtained.

It is noted here that a preferred value of the viscosity-average polymerization degree of the polyvinyl acetal resin is the same as that of the viscosity-average polymerization degree described above for the polyvinyl alcohol-based resin. When polyvinyl acetal resin film comprises two or more different polyvinyl acetal resins, it is preferred that the viscosity-average polymerization degree of at least one of the polyvinyl acetal resins be in a range of from the above-described lower limit value to the above-described upper limit value. The viscosity-average polymerization degree of the polyvinyl alcohol-based resin can be determined in accordance with JIS K6726 "Testing Methods for Polyvinyl Alcohol".

From the viewpoint of the ease of obtaining good film-forming property, the polyvinyl acetal resin film preferably comprises an uncrosslinked polyvinyl acetal. The polyvinyl acetal resin film may also comprise a crosslinked polyvinyl acetal. A method for crosslinking a polyvinyl acetal is described in, for example, EP 1527107 B1 and WO 2004/063231 A1 (thermal self-crosslinking of carboxyl group-containing polyvinyl acetal), EP 1606325 A1 (polyvinyl acetal crosslinked with polyaldehyde), and WO 2003/020776 A1 (polyvinyl acetal crosslinked with glyoxylic acid). It is also useful to control the amount of intermolecular acetal bonds to be formed and/or the blocking degree of a residual hydroxyl group by adjusting the acetalization reaction conditions as appropriate.

(Plasticizer)

In the present invention, the amount of a plasticizer in the polyvinyl acetal resin film is 0 to 20% by mass based on a total mass of the polyvinyl acetal resin film. When the plasticizer amount is greater than 20I by mass, good film-forming property is unlikely to be obtained. In addition, self-adhesion of the resin film is more likely to occur particularly in a high-temperature environment, which makes it difficult to obtain a uniform surface, and deformation tends to easily occur; therefore, for example, when a functional layer is laminated on the polyvinyl acetal resin film to produce a laminated glass, good functionality cannot be exerted. By reducing the plasticizer amount or not incorporating any plasticizer, the polyvinyl acetal resin film tends to be provided with excellent film-forming property and ease of handling; however, at the same time, the generation of roll wrinkles is made more likely to occur in a low-plastic or non-plastic polyvinyl acetal resin film. In the polyvinyl acetal resin film of the present invention, by finely controlling the 10-point average roughness of both surfaces of the resin film as well as the uniformity thereof, one surface of the resin film and the other surface are provided with different surface profiles and each allowed to entirely have a uniform surface roughness. As a result, even in a resin film which by nature easily forms roll wrinkles due to a small plasticizer amount, appropriate voids are generated between adjacent resin films and the generation of roll wrinkles can thus be effectively inhibited, so that a uniform film surface is likely to be obtained when the film is unwound. Accordingly, by laminating a functional layer and the like on the relatively smooth surface (surface B), a laminated glass in which the functional layer is hardly deformed or broken over time can be obtained, and the polyvinyl acetal resin film of the present invention can be suitably used as a resin film for a laminated glass having such a functional film and the like.

The plasticizer amount is preferably 0 to 19% by mass, more preferably 0 to 15% by mass, still more preferably 0 to 10% by mass, particularly preferably 0 to 5% by mass, based on a total mass of the polyvinyl acetal resin film. When the plasticizer amount in the polyvinyl acetal resin film is in this range, the polyvinyl acetal resin film tends to have excellent film-forming property and ease of handling, and can be suitably used for the production of a laminated glass having a functional layer and the like.

When a plasticizer is incorporated into the polyvinyl acetal resin film, one or more compounds of the following groups are preferably used as the plasticizer.

Esters of polyvalent aliphatic or aromatic acids, examples of which include: dialkyl adipates (e.g., dihexyl adipate, di-2-ethylbutyl adipate, dioctyl adipate, di-2-ethylhexyl adipate, hexylcyclohexyl adipate, diheptyl adipate, dinonyl adipate, diisononyl adipate, heptylnonyl adipate); esters of adipic acid and an alcohol or an ether compound-containing alcohol [e.g., di(butoxyethyl) adipate and di(butoxyethoxyethyl)adipate]; dialkyl sebacates (e.g., dibutyl sebacate); esters of sebacic acid and an alicyclic or ether compound-containing alcohol; phthalic acid esters (e.g., butylbenzyl phthalate and bis-2-butoxyethyl phthalate); and esters of an alicyclic polycarboxylic acid and an aliphatic alcohol (e.g., diisononyl 1,2-cyclohexane dicarboxylate);

Esters or ethers of polyvalent aliphatic or aromatic alcohols or oligoether glycols having at least one aliphatic or aromatic substituent, examples of which include: esters of glycerin, diglycol, triglycol, tetraglycol or the like and a linear or branched, aliphatic or alicyclic carboxylic acid, specifically diethylene glycol-bis-(2-ethylhexanoate), triethylene glycol-bis-(2-ethylhexanoate) (hereinafter, may be referred to as "3GO"), triethylene glycol-bis-(2-ethylbutanoate), tetraethylene glycol-bis-n-heptanoate, triethylene glycol-bis-n-heptanoate, triethylene glycol-bis-n-hexanoate, tetraethylene glycol dimethyl ether, and dipropylene glycol dibenzoate;

Phosphoric acid esters of aliphatic or aromatic alcohols, examples of which include tris(2-ethylhexyl)phosphate, triethyl phosphate, diphenyl-2-ethylhexyl phosphate, and tricresyl phosphate; and Esters of citric acid, succinic acid, and/or fumaric acid.

Further, as the plasticizer, a polyester or oligoester formed from a polyhydric alcohol and a polycarboxylic acid, a terminal esterified product or etherified product thereof, a polyester or oligoester formed from lactone or hydroxycarboxylic acid, or a terminal esterified product or etherified product thereof may be used.

When the polyvinyl acetal resin film comprises a plasticizer, from the viewpoint of preventing the problems (e.g., changes in physical properties over time) that are associated with migration of the plasticizer between the polyvinyl acetal resin film and a plasticized polyvinyl acetal resin layer optionally laminated thereon, it is preferred to use the same plasticizer as the one contained in the plasticized polyvinyl acetal resin layer to be laminated, or a plasticizer that does not impair the physical properties (e.g., heat resistance, light resistance, transparency, and plasticization efficiency) of the plasticized polyvinyl acetal resin layer. From this standpoint, the polyvinyl acetal resin film contains, as the plasticizer, preferably triethylene glycol-bis-(2-ethylhexanoate), triethylene glycol-bis-(2-ethylbutanoate), tetraethylene glycol-bis-(2-ethylhexanoate), or tetraethylene glycol bis-heptanoate, particularly preferably triethylene glycol-bis-(2-ethylhexanoate).

The polyvinyl acetal resin film of the present invention may further comprise other additives. Examples of such additives include water, a UV absorber, an antioxidant, an adhesion modifier, a brightener or fluorescent brightener, a stabilizer, a dye, a processing aid, an impact resistance improving agent, a fluidity improving agent, a cross-linking agent, a pigment, a light-emitting material, a refractive index modifier, a heat insulating material, organic or inorganic nanoparticles, a calcined silicate, and a surfactant.

By reducing the amount of gel in the polyvinyl acetal resin film, the generation of convex defects is made less likely to occur on the polyvinyl acetal resin film, and this makes it easier to control the Rz values in a relatively small range. In order to reduce the amount of gel in the polyvinyl acetal resin film, it is useful to inhibit the generation of gel during pelletization of the polyvinyl acetal resin and film formation and, for this purpose, it is useful to add a stabilizer, such as an antioxidant, to the polyvinyl acetal resin material constituting the polyvinyl acetal resin film.

Examples of the antioxidant include phenolic antioxidants, phosphorus-based antioxidants, and sulfur-based antioxidants, among which phenolic antioxidants are preferred, and alkyl-substituted phenolic antioxidants are particularly preferred.

Examples of the phenolic antioxidants include: acrylate compounds, such as 2-t-butyl-6-(3-t-butyl-2-hydroxy-5-methylbenzyl)-4-methylphenyl acrylate, and 2,4-di-t-amyl-6-[1-(3,5-di-t-amyl-2-hydroxyphenyl)ethyl]phenyl acrylate; alkyl-substituted phenolic compounds, such as 2,6-di-t-butyl-4-methylphenol, 2,6-di-t-butyl-4-ethylphenol, octadecyl-3-(3,5-)di-t-butyl-4-hydroxyphenyl)propionate, 2,2'-methylene-bis(4-methyl-6-t-butylphenol), 4,4'-butylidene-bis(4-methyl-6-t-butylphenol), 4,4'-butylidene-bis(6-t-butyl-m-cresol), 4,4'-thiobis(3-methyl-6-t-butylphenol), bis(3-cyclohexyl-2-hydroxy-5-methylphenyl)methane, 3,9-bis{2-}3-(3-t-butyl-4-hydroxy-5-methylphenyl) propionyloxy]-1,1-dimethylethyl}-2,4,8,10-tetraoxaspiro[5,5]undecane, 1,1,3-tris(2-methyl-4-hydroxy-5-t-butylphenyl) butane, 1,3,5-trimethyl-2,4,6-tris(3,5-di-t-butyl-4-hydroxybenzyl)benzene, tetrakis[methylene-3-(3',5'-di-t-butyl-4'-hydroxyphenyl)propionate]methane, and triethylene glycol bis[3-(3-t-butyl-4-hydroxy-5-methylphenyl)propionate]; and triazine group-containing phenol compounds, such as 6-(4-hydroxy-3,5-di-t-butylanilino)-2,4-bis-octylthio-1,3,5-triazine, 6-(4-hydroxy-3,5-dimethylanilino)-2,4-bis-octylthio-1,3,5-triazine, 6-(4-hydroxy-3-methyl-5-t-butylanilino)-2,4-bis-octylthio-1,3,5-triazine, and 2-octylthio-4,6-bis-(3,5-di-t-butyl-4-oxyanilino)-1,3,5-triazine.

Examples of the phosphorus-based antioxidants include: monophosphite compounds, such as triphenyl phosphite, diphenyl isodecyl phosphite, phenyl diisodecyl phosphite, tris(nonylphenyl)phosphite, tris(dinonylphenyl)phosphite, tris(2-t-butyl-4-methylphenyl)phosphite, tris(cyclohexylphenyl)phosphite, 2,2-methylene-bis(4,6-di-t-butylphenyl)octyl phosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, and 10-decyloxy-9,10-dihydro-9-oxa-10-phosphaphenanthrene; and diphosphite compounds, such as 4,4'-butylidene-bis(3-methyl-6-t-butylphenyl-di-tridecylphosphite), 4,4'-isopropylidene-bis (phenyl-di-alkyl($C_{12}$ to $C_{15}$) phosphite), 4,4'-isopropylidene-bis(diphenylmonoalkyl($C_{12}$ to $C_{15}$) phosphite), 1,1,3-tris(2-methyl-4-di-tridecyl phosphite-5-t-butylphenyl) butane, and diphosphite compounds, such as tetrakis(2,4-di-t-butylphenyl)-4,4'-biphenylene phosphite. Among these phosphorus-based antioxidants, monophosphite compounds are preferred.

Examples of the sulfur-based antioxidants include dilauryl 3,3'-thiodipropionate, distearyl 3,3-thiodipropionate, laurylstearyl 3,3'-thiodipropionate, pentaerythritol-tetrakis-(β-lauryl-thiopropionate), and 3,9-bis(2-dodecylthioethyl)-2,4,8,10-tetraoxaspiro[5.5]undecane.

These antioxidants may be used singly, or in any combination of two or more thereof. The amount of the antioxidant(s) to be added is preferably not less than 0.001 parts by mass, more preferably not less than 0.01 parts by mass, with respect to 100 parts by mass of the polyvinyl acetal resin. When the amount of the antioxidant(s) is not less than the above-described lower limit value, the generation of gel caused by degradation of the polyvinyl acetal resin or the like is likely to be effectively inhibited. Meanwhile, the amount of the antioxidant(s) to be added is usually not greater than 5 parts by mass, preferably not greater than 1 part by mass, more preferably not greater than 0.1 parts by mass, with respect to 100 parts by mass of the polyvinyl acetal resin. The antioxidant(s) may be added in an amount of greater than 5 parts by mass; however, such an amount is not expected to have an outstanding effect in terms of the inhibition of gel generation.

Further, in order to inhibit the oxidative degradation of the polyvinyl acetal resin, it is also preferred to perform at least some of the production steps of the polyvinyl acetal resin film under a nitrogen atmosphere, for example, to purge the vicinities of a feed port and a discharge port with nitrogen at the time of producing the polyvinyl acetal resin film using an extruder.

Examples of other stabilizers include UV absorbers, UV screening agents, and light stabilizers.

Examples of the UV absorbers include: benzotriazole-based UV absorbers, such as 2-(5-methyl-2-hydroxyphenyl) benzotriazole, 2-[2-hydroxy-3,5-bis($\alpha,\alpha'$-dimethylbenzyl) phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-5-methyl-2-hydroxyphenyl)-5-chlorobenzotriazole, 2-(3,5-di-t-amyl-2-hydroxyphenyl)benzotriazole, and 2-(2'-hydroxy-5'-t-octylphenyl)benzotriazole; hindered amine-based UV absorbers, such as 2,2,6,6-tetramethyl-4-piperidylbenzoate, bis(2,2,6,6-tetramethyl-4-piperidyl)sebacate, bis(1,2,2,6,6-pentamethyl-4-piperidyl)-2-(3,5-di-t-butyl-4-hydroxybenzyl)-2-n-butylmalonate, and 4-[3-(3,5-di-t-butyl-4-hydroxyphenyl)propionyloxy]-1-{2-[3-(3,5-di-t-butyl-4-hydroxyphenyl)propionyloxy]ethyl}-2,2,6,6-tetramethylpiperidine; benzoate-based UV absorbers, such as 2,4-di-t-butylphenyl-3,5-di-t-butyl-4-hydroxybenzoate and hexadecyl-3,5-di-t-butyl-4-hydroxybenzoate; and malonic acid ester-based UV absorbers.

Examples of the malonic acid ester-based UV absorbers include dimethyl 2-(p-methoxybenzylidene)malonate, tetraethyl-2,2-(1,4-phenylenedimethylidene)bismalonate, and 2-(p-methoxybenzylidene)-bis(1,2,2,6,6-pentamethyl-4-piperidinyl)malonate. Commercially available malonic acid ester-based UV absorbers may be used, and examples thereof include HOSTAVIN B-CAP, HOSTAVIN PR-25, and HOSTAVIN PR-31 (all of which are manufactured by Clariant).

Examples of the UV screening agents include oxanilide compounds, for example, oxalic diamides having a substituted aryl group or the like on a nitrogen atom, such as N-(2-ethylphenyl)-N'-(2-ethoxy-5-t-butylphenyl) oxalic diamide, N-(2-ethylphenyl)-N'-(2-ethoxy-phenyl)oxalic diamide, and 2-ethyl-2'-ethoxy-oxanilide ("SANDUVOR VSU" manufactured by Clariant).

The amount of a UV absorber or UV screening agent to be added is preferably not less than 10 ppm, more preferably not less than 100 ppm, based on mass with respect to the polyvinyl acetal resin contained in the polyvinyl acetal resin film. When the amount of the UV absorber or UV screening agent is not less than the above-described lower limit value, a sufficient effect is likely to be exerted. Meanwhile, the amount of the UV absorber or UV screening agent to be added is usually 50,000 ppm or less, preferably 10,000 ppm or less, based on mass with respect to the polyvinyl acetal resin contained in the polyvinyl acetal resin film. A UV absorber or UV screening agent may be added in an amount of greater than 50,000 ppm; however, such an amount is not expected to have an outstanding effect in terms of the inhibition of gel generation.

The above-described UV absorbers and UV screening agents may be used singly, or in any combination of two or more thereof.

As a light stabilizer, a hindered amine-based light stabilizer can be used, and examples of commercially available products thereof include "ADK STAB LA-57 (trade name)" manufactured by ADEKA Corporation.

The amount of the polyvinyl acetal resin in the polyvinyl acetal resin film of the present invention is preferably not less than 75% by mass, more preferably not less than 80% by mass, still more preferably not less than 85% by mass, yet still more preferably not less than 90% by mass, particularly preferably not less than 95% by mass, based on a total mass of the polyvinyl acetal resin film. When the amount of the polyvinyl acetal resin in the polyvinyl acetal resin film is in this range, a polyvinyl acetal resin film having excellent transparency, film-forming property, and ease of handling is likely to be obtained, and the resin film can be suitably used for the production of a laminated glass having a functional layer and the like.

The polyvinyl acetal resin film of the present invention may have a layer separation structure constituted by multiple components; however, in the layer separation structure, island components have an average particle size of preferably smaller than 100 nm, more preferably smaller than 80 nm, and it is particularly preferred that the polyvinyl acetal resin film does not show a sea-island layer separation structure. By not showing a sea-island layer separation structure or by having a sufficiently fine particle size, the polyvinyl acetal resin film can be ensured to have such transparency that allows the use thereof for a vehicle windshield and the like.

(Method of Producing Polyvinyl Acetal Resin Film)

A method of producing the polyvinyl acetal resin film is not particularly restricted. The polyvinyl acetal resin film can be produced by blending the above-described polyvinyl acetal resin with, depending on the case, a prescribed amount of a plasticizer and other additives as necessary, homogeneously kneading the resultant, and then molding the kneaded product into a film shape by a known film forming method, such as an extrusion method, a calendering method, a press method, a casting method, or an inflation method.

Among known film forming methods, a method of producing the film using an extruder is particularly preferably employed. The resin temperature during extrusion is preferably 150 to 250° C., more preferably 170 to 230° C. An excessively high resin temperature causes degradation of the polyvinyl acetal resin, and this leads to a high content of a volatile substance. Meanwhile, an excessively low resin temperature also leads to a high content of a volatile substance. For efficient removal of a volatile substance, it is preferred to remove the volatile substance by vacuuming through a vent opening of the extruder.

In melt extrusion, by using cooling rolls having different surface profiles and materials, the 10-point average roughness of the resulting resin film surfaces and the uniformity thereof (standard deviation of 10-point average roughness of each surface/value of Rz1(a) or Rz2(a)) can be controlled in specific ranges. For example, for the formation of a smooth surface, a smooth (mirror-finished) cooling roll typified by a mirror-finished metal cooling roll such as a metal elastic roll or a metal hard roll can be used and, for the formation of a rough surface, a metal elastic roll, a rubber elastic roll or an embossing roll, which corresponds to a desired surface profile (surface roughness), can be used. In order to allow each surface of the resin film to have a 10-point average roughness and a uniformity in the above-described respective specific ranges, it is preferred to select these rolls as appropriate for controlling the surface profiles of both surfaces of the resin film and to form the film using a resin material extruded from a T-die. For example, by using a mirror-finished roll as one of a pair of rolls for nipping the extruded resin material and using an embossing roll or the like suitable for forming irregularities as the other roll, a resin film having a smooth surface and a relatively rough surface can be obtained. In such molding, by selecting an embossing roll having a small variation in its surface profile, or by selecting molding conditions such that the same embossed shape-forming ratio can be obtained in the width direction during extrusion molding, the values of [standard deviation of 10-point average roughness of each surface/ Rz1(a) or Rz2(a)] can be controlled in the preferred range of the present invention.

From the viewpoint of making it easier to control the surface profiles of the respective surfaces of the polyvinyl acetal resin film and to attain the above-described specific 10-point average roughness and uniformity thereof, it is preferred to use a roll selected from a metal roll and a rubber roll as least one of a pair of rolls for the film formation, and it is more preferred to use a metal roll. Further, from the same viewpoint, the temperature of the polyvinyl acetal resin film at the time of being peeled off from the cooling rolls is lower than the glass transition temperature of the polyvinyl acetal resin contained in the polyvinyl acetal resin film by preferably not less than 5° C., more preferably not less than 10° C., still more preferably not less than 15° C., particularly preferably not less than 20° C. When the temperature of the polyvinyl acetal resin film at the time of being peeled off from the cooling rolls and the above-described glass transition temperature satisfy this relationship, surface roughness due to the tackiness of the polyvinyl acetal resin film at the time of being peeled off from the cooling rolls, or thickness unevenness due to shrinkage and the like of the film, is likely to be reduced. When the polyvinyl acetal resin contained in the polyvinyl acetal resin film comprises two or more polyvinyl acetal resins, it is preferred that the glass transition temperature of at least one of the polyvinyl acetal resins and the temperature of the polyvinyl acetal resin film at the time of being peeled off from the cooling rolls satisfy the above-described relationship.

In the present invention, the 10-point average roughness of each surface of the polyvinyl acetal resin film and the uniformity thereof (standard deviation of 10-point average roughness of each surface/value of Rz1(a) or Rz2(a)) are both affected by the surface profile of the film; however, the 10-point average roughness and the uniformity thereof do not necessarily have a certain correlation. Therefore, in the polyvinyl acetal resin film of the present invention, it is important to control the 10-point average roughness and the values of [standard deviation of 10-point average roughness of each surface/Rz1(a) or Rz2(a)] in the above-described respective prescribed ranges.

<Polyvinyl Acetal Resin Film Roll>

In the polyvinyl acetal resin film of the present invention, one surface and the other surface have different surface profiles from each other, and the surface roughness of each surface is entirely uniform; therefore, the resin film has an excellent self-adhesion inhibiting effect when rolled into the form of a roll. In addition, by winding the resin film such that the side of the surface A having a rougher surface is on the inside of the resulting roll, foreign matters such as debris and dust are made unlikely to adhere thereto during storage, transport, delivery and the like. Conversely, by winding the resin film such that the surface A is on the inside of the resulting roll, it is made easy to remove foreign matters such as debris and dust even if they adhere to the resin film. The unlikelihood of adhesion of foreign matters and the ease of removing foreign matters are each also advantageous in terms of improving the working efficiency in the use of the film roll. Accordingly, the present invention also relates to a polyvinyl acetal resin film roll which comprises the polyvinyl acetal resin film of the present invention that is wound such that the surface A side is on the inside, and a polyvinyl acetal resin film roll which comprises the polyvinyl acetal resin film of the present invention that is wound such that the surface A side is on the outside.

The polyvinyl acetal resin film roll of the present invention can be produced by a known method using a known apparatus/equipment. For example, the polyvinyl acetal resin film of the present invention in an elongated form may be wound on an appropriate winding core such that a desired surface is on the inside or the outside. Examples of a material constituting the winding core include synthetic resins, such as polyethylene resins, polypropylene resins, polyvinyl chloride resins, polyester resins, epoxy resins, phenol resins, melamine resins, silicon resins, polyurethane resins, polycarbonate resins, and ABS resins; metals, such as aluminum; fiber-reinforced plastics; and papers. The winding core usually has a shape of a cylinder, a column or the like, and the diameter thereof may be, for example, 20 to 200 mm. The diameter of the film roll (post-winding diameter) is not particularly restricted; however, it is usually 30 to 800 mm.

The tension, the winding rate, the temperature and the like during the winding of the polyvinyl acetal resin film may be selected as appropriate in accordance with the formulation, the width, the thickness and the like of the resin film.

<Method of Storing Polyvinyl Acetal Resin Film Roll>

The polyvinyl acetal resin film of the present invention has a high self-adhesion inhibiting effect in a wide temperature range including a high-temperature environment. Therefore, the present invention also relates to a method of storing a polyvinyl acetal resin film roll, the method comprising storing the polyvinyl acetal resin film roll of the present invention at a temperature of −20° C. to 60° C. Particularly, as generally compared to a case of storing the polyvinyl acetal resin film at a low temperature (e.g., 20° C. or lower), in a case of storing the polyvinyl acetal resin film in an environment where the temperature can be high at 30° C. or higher, particularly 50° C. or higher, self-adhesion may occur more easily during the storage; however, by appropriately controlling the surface profiles of both surfaces of the resin film as well as the uniformity thereof, such self-adhesion of films is made unlikely to occur even when the resin film is stored over an extended period. Therefore, in the storage method of the present invention, an excellent self-adhesion inhibiting effect can be obtained even when the resin film roll is stored particularly at a temperature of 50° C. or higher. It is noted here that, in the storage method of the present invention, the expression "storing at a temperature of x° C. or higher" encompasses not only a case of storing the resin film roll under an environment that is constantly controlled at a specific temperature of not lower than x° C., but also, for example, a case that includes a period of storing the resin film roll at the specific temperature or higher as a result of storing the resin film roll under room temperature. Further, during the storage, the conditions other than the above-described temperature are not particularly restricted and, for example, the polyvinyl acetal resin film roll may be in a state of being left to stand, or in a state of being subjected to vibrations due to transport or the like.

The storage conditions of the polyvinyl acetal resin film roll may be decided as appropriate in accordance with the composition and the like of the polyvinyl acetal resin film.

<Functional Layer-Equipped Polyvinyl Acetal Resin Film>

The polyvinyl acetal resin film of the present invention not only has an excellent self-adhesion inhibiting and hardly causes deformation over time, but also has a high surface uniformity when unwound from a roll; therefore, the polyvinyl acetal resin film of the present invention is suitable as a resin film on which a functional layer is to be laminated. Accordingly, the present invention also relates to a functional layer-equipped polyvinyl acetal resin film which comprises a functional layer on at least one surface of the polyvinyl acetal resin film of the present invention. In the present invention, the term "functional layer" means a layer that imparts a specific function to a laminate such as a laminated glass. The functional layer may be provided singly, or in a plural number. When the polyvinyl acetal resin film has plural functional layers, the functional layers may be of the same type, or different types.

When a functional layer is arranged, it is preferably arranged on the surface B, which is a smoother surface of the polyvinyl acetal resin film of the present invention. By arranging a functional layer on the surface B, the adhesion between the polyvinyl acetal resin film and the functional layer is improved, and deformation and breakage of the functional layer over time are made unlikely to occur. When the functional layer-equipped polyvinyl acetal resin film has plural functional layers, the surface on which each functional layer is to be laminated may be selected as appropriate in accordance with the type and the purpose of the functional layer; however, in the production of a laminate (laminated glass) described below, foaming in the resulting laminated glass or the like can be effectively inhibited by bonding the surface A, which is a rougher surface of the polyvinyl acetal resin film of the present invention, with a transparent substrate; therefore, it is preferred that the plural functional layers be all arranged on the side of the surface B.

On a surface of the polyvinyl acetal resin film on which a functional layer is arranged, the polyvinyl acetal resin film may have the functional layer on the entirety of this surface, or may have the functional layer on a part of the surface. When a laminate is produced by laminating a plasticized polyvinyl acetal resin layer on the polyvinyl acetal resin film as described below, it is preferred that the polyvinyl acetal resin film have the functional layer on a part of its surface such that a plasticizer contained in the plasticized polyvinyl acetal resin layer can migrate to the polyvinyl acetal resin film. However, this does not apply to a case where the functional layer does not inhibit the migration of the plasticizer from the plasticized polyvinyl acetal resin layer to the polyvinyl acetal resin film.

The functional layer is preferably at least one selected from the group consisting of a conductive layer, a specificwavelength electromagnetic wave reflection layer such as an infrared reflection layer or a UV reflection layer, a color correction layer, an infrared absorption layer, a UV absorption layer, a fluorescent/light-emitting layer, a sound insulation layer, an electrochromic layer, a photochromic layer, a thermochromic layer, a design layer, and a high-elastic-modulus layer.

The polyvinyl acetal resin film of the present invention is configured such that deformation and the like thereof hardly occurs because of a relatively low plasticizer content, and both surfaces of the resin film have the above-described respective specific surface roughness values; therefore, by appropriately selecting the surface on which the functional layer is to be laminated, a high effect of inhibiting deformation and breakage of the functional layer over time can be obtained. Accordingly, the polyvinyl acetal resin film of the present invention is particularly suitable for the production of a resin film comprising a conductive layer, where deformation and breakage are likely to occur in a conventional polyvinyl acetal resin film. Therefore, in one mode of the present invention, the functional layer is preferably a conductive layer.

From the viewpoint of, for example, electrical resistance and ease of production, the thickness of the conductive layer is preferably 1 to 30 µm, more preferably 2 to 15 µm, particularly preferably 3 to 10 µm. The thickness of the conductive layer is measured using, for example, a thickness gauge or a laser microscope.

From the viewpoint of, for example, electrical resistance, heat generation performance, electromagnetic wave absorption, and optical properties, the conductive layer preferably has a linear, grid-like or mesh-like shape. Examples of the linear shape include a straight-line shape, an undulating shape, and a zigzag shape. A single conductive layer may have a single shape, or a combination of plural shapes.

In one embodiment in which, for example, a conductive layer is formed by a printing method and a laminate (laminated glass) is partially heated or used as a sensor or an antenna in a domain where it is not important to ensure forward visibility, from the viewpoint of ensuring a sufficient amount of heat generation or sufficient functionality as a sensor or an antenna as well as from the viewpoint of the ease of production, the conductive layer is preferably formed of plural linear conductive materials having a line width of 0.001 to 5 mm. In other words, the linear conductive materials (wiring) constituting the above-described linear, grid-like or mesh-like shape preferably have a line width of 0.001 to 5 mm. The line width is more preferably 0.01 to 2 mm, particularly preferably 0.03 to 1 mm.

In another embodiment in which, for example, a laminate is entirely heated, from the viewpoint of ensuring both a sufficient amount of heat generation and good forward visibility, the conductive layer is preferably formed of plural linear conductive materials having a line width of 1 to 30 µm. In other words, the linear conductive materials constituting the above-described linear, grid-like or mesh-like shape preferably have a line width of 1 to 30 µm. The line width is more preferably 2 to 15 µm, particularly preferably 3 to 12 µm.

From the viewpoint of the ease of ensuring electrical resistance or heat generation and the ease of production, the conductive materials constituting the conductive layer preferably comprise silver or copper, more preferably consist of silver or copper. Further, from the economic viewpoint, the conductive materials more preferably comprise copper, still more preferably consist of copper.

In an embodiment in which the conductive layer is based on a metal foil, it is preferred that at least one surface of the conductive layer be treated to have a low reflectance, and it is more preferred that both surfaces of the conductive layer be treated to have a low reflectance. In the present invention, the expression "treated to have a low reflectance" means that the conductive layer is treated such that it has a visible light reflectance of 30% or lower as measured in accordance with JIS R3106. From the viewpoint of forward visibility, it is more preferred that the conductive layer be treated such that it has a visible light reflectance of 10% or lower. When the visible light reflectance is not higher than the above-described upper limit value, a desired visible light reflectance is likely to be obtained in the production of a laminate using the polyvinyl acetal resin film having the conductive layer and, for example, when the resulting laminate is used as a laminated glass of a vehicle, excellent forward visibility tends to be obtained.

Examples of a method for such a low-reflectance treatment include blackening (darkening), browning, and plating. From the viewpoint of process passability, the low-reflectance treatment is preferably a blackening treatment. Accordingly, from the viewpoint of attaining good forward visibility, it is particularly preferred that one or both surfaces, or the entire surface of the conductive layer be blackened such that the conductive layer has a visible light reflectance of 10% or lower. Specifically, the blackening treatment is performed using an alkali-based blackening solution or the like.

<Method of Producing Functional Layer-Equipped Polyvinyl Acetal Resin Film>

A method of producing the functional layer-equipped polyvinyl acetal resin film is not particularly restricted, and the functional layer-equipped polyvinyl acetal resin film can be produced by, for example, a method that comprises coating, printing, or laminating a material constituting the functional layer on a surface of the polyvinyl acetal resin film on which the functional layer is to be arranged.

A method of coating, printing, or laminating the material constituting the functional layer is not particularly restricted.

Examples of a coating method include: a method of coating the functional layer with a melt of a resin material constituting the polyvinyl acetal resin film (e.g., a method of melt-extruding the resin material onto the functional layer, or a method of applying the resin material onto the functional layer by knife coating or the like); a method of applying the functional layer to the polyvinyl acetal resin film by vapor deposition, sputtering, or electrodeposition; a method of, when the functional layer is formed of a resin material, extruding the resin material constituting the polyvinyl acetal resin film simultaneously with the resin material constituting the functional layer; and a method of dipping the polyvinyl acetal resin film in a solution of a resin material constituting the functional layer.

Examples of a printing method include screen printing, flexographic printing, and gravure printing. In the printing method, an ink which is dried or cured by heat or light is used before laminating the polyvinyl acetal resin film having the functional layer.

Examples of a laminating (pasting) method include: a method of superimposing and thermocompression-bonding the functional layer and the polyvinyl acetal resin film; a method of bonding the functional layer and the polyvinyl acetal resin film by coating either or both thereof with a solvent or a solution of a resin material (composition) that contains a resin constituting the polyvinyl acetal resin film and a solvent, or by injecting the solvent or the solution between the functional layer and the polyvinyl acetal resin film; and a method of bonding the functional layer and the polyvinyl acetal resin film with an adhesive. The adhesive used in the method of bonding with an adhesive may be any adhesive that is commonly used in the art, and examples thereof include acrylate-based adhesives, urethane-based adhesives, epoxy-based adhesives, and hot melt adhesives. In an embodiment in which optically excellent properties are required, from the viewpoint of avoiding the generation of haze caused by an adhesive, a method of bonding the functional layer and the polyvinyl acetal resin film without using an adhesive is preferred.

In an embodiment in which the functional layer is a conductive layer, the ink used in the printing method usually contains conductive particles and/or conductive fibers. The conductive particles and conductive fibers are not particularly restricted, and examples thereof include: metal particles (e.g., particles of gold, silver, copper, zinc, iron, or aluminum); metal-coated particles and fibers (e.g., silver-plated glass fibers and glass spheres); and particles and fibers of conductive carbon black, carbon nanotubes, graphite, or graphene. The conductive particles may be particles of a semiconductor, such as particles of a conductive metal oxide, for example, particles of indium-doped tin oxide, indium-doped zinc oxide, or antimony-doped tin oxide. From the viewpoint of conductivity, the above-described ink preferably contains silver particles, copper particles and/or carbon nanotubes, more preferably contains silver particles or copper particles and, from the economic viewpoint, the ink particularly preferably contains copper particles.

In one preferred embodiment of the present invention, the conductive layer (conductive structure) is an etched structure of a metal foil. This embodiment is preferred from the viewpoint of its high production efficiency in providing the conductive structure as well as from the viewpoint of the ease of performing a blackening treatment. The step of bonding the metal foil and the polyvinyl acetal resin film can be carried out by, for example, any of the following methods (I) to (III):

(I) a method of superimposing and thermocompression-bonding the polyvinyl acetal resin film and the metal foil;

(II) a method of covering the metal foil with a melt of a resin material constituting the polyvinyl acetal resin film, for example, a method of melt-extruding the resin material on the metal foil, or a method of applying the resin material onto the metal foil by knife coating or the like; and (III) a method of bonding the metal foil and the polyvinyl acetal resin film by coating either or both thereof with a solvent or a solution or dispersion of a resin material (composition) that contains a resin constituting the polyvinyl acetal resin film and a solvent, or by injecting the solvent or the solution or dispersion between the metal foil and the polyvinyl acetal resin film.

The bonding temperature for the thermocompression bonding of the metal foil and the polyvinyl acetal resin film in the above-described method (I) varies depending on the type of the resin constituting the polyvinyl acetal resin film; however, it is usually 90 to 170° C., preferably 100 to 160° C., more preferably 105 to 155° C., still more preferably 105 to 150° C. When the bonding temperature is in this range, a good bonding strength is likely to be obtained.

From the viewpoint of reducing the content of a volatile substance in the polyvinyl acetal resin film, the resin temperature during the extrusion in the above-described method (II) is preferably 150 to 250° C., more preferably 170 to 230° C.

As the solvent in the above-described method (III), it is preferred to use a plasticizer that is usually used in a polyvinyl acetal resin.

The step of forming a conductive layer of a desired shape from the thus obtained metal foil-equipped polyvinyl acetal resin film can be carried out by a known photolithography method. This step can be carried out by, for example, as described below in the section of Examples, first laminating a dry film resist on the metal foil of the metal foil-equipped polyvinyl acetal resin film, forming an etching resistance pattern by a photolithography method, subsequently immersing the polyvinyl acetal resin film thus provided with the etching resistance pattern in an etching solution to form a shape of the conductive layer, and then removing the remaining photoresist layer by a known method.

<Laminate>

The present invention relates to a laminate comprising a transparent substrate and the polyvinyl acetal resin film or functional layer-equipped polyvinyl acetal resin film of the present invention. The present invention also relates to a laminate comprising the polyvinyl acetal resin film or functional layer-equipped polyvinyl acetal resin film of the present invention between plural transparent substrates.

From the viewpoint of transparency, weather resistance and mechanical strength, the transparent substrates are each preferably an inorganic glass (hereinafter, may be simply referred to as "glass"), or an organic glass such as a methacrylic resin sheet, a polycarbonate resin sheet, a polystyrene-based resin sheet, a polyester-based resin sheet, a polyimide-based resin sheet, or a polycycloolefin-based resin sheet, more preferably an inorganic glass, a methacrylic resin sheet or a polycarbonate resin sheet, particularly preferably an inorganic glass. Examples of the inorganic glass include, but not particularly limited to: a float glass, a tempered glass, a semi-tempered glass, a chemically tempered glass, a green glass, and a quartz glass. Further, the shape of each transparent substrate to be used is not particularly restricted, and the transparent substrate may have a simple planar shape, or may have a curvature.

In the laminate comprising the functional layer-equipped polyvinyl acetal resin film, the functional layer of the polyvinyl acetal resin film may be in contact with a transparent substrate, or may be in contact with other layer, such as the below-described plasticized polyvinyl acetal resin layer.

When the laminate comprises a conductive layer as the functional layer, each wiring of the conductive layer is usually connected to bus bars. As the bus bars, ones that are generally used in the art can be used, and examples thereof include metal foil tapes, metal foil tapes with a conductive adhesive, and conductive pastes. Further, each bus bar may be formed by leaving a portion of a metal foil, simultaneously with the formation of the conductive layer. Since the bus bars are each connected to feeder wires that are each connected to a power source, an electric current is supplied to this conductive structure.

In the present invention, the laminate may further comprise a plasticized polyvinyl acetal resin layer. The plasticized polyvinyl acetal resin layer comprises a polyvinyl acetal resin and a plasticizer. As the polyvinyl acetal resin and the plasticizer that are contained in the plasticized polyvinyl acetal resin layer, it is possible to use the same ones as those that are exemplified above and can constitute the polyvinyl acetal resin film of the present invention.

The content of the plasticizer in the plasticized polyvinyl acetal resin layer in the initial state prior to lamination of layers is preferably not less than 16.0% by mass, more preferably 16.1 to 36.0% by mass, still more preferably 22.0 to 32.0% by mass, particularly preferably 26.0 to 30.0% by mass, based on a total mass of the plasticized polyvinyl acetal resin layer. When the content of the plasticizer is in this range, a laminated glass having excellent impact resistance is likely to be obtained. As the plasticized polyvinyl acetal resin layer, a plasticized polyvinyl acetal resin layer having a sound insulation function can be used. In this case, the content of the plasticizer in the initial state prior to lamination of layers is preferably not less than 30% by mass, more preferably 30 to 50% by mass, still more preferably 31 to 40% by mass, particularly preferably 32 to 35% by mass, based on a total mass of the plasticized polyvinyl acetal resin layer.

The plasticized polyvinyl acetal resin layer may also contain, as required, an additive(s) such as those that are exemplified above and constitute the polyvinyl acetal resin film of the present invention. Further, the plasticized polyvinyl acetal resin layer can be produced by the same method as the one used for producing the polyvinyl acetal resin film of the present invention.

The thickness of the plasticized polyvinyl acetal resin layer is preferably 100 to 1,600 μm, more preferably 350 to 1,200 μm, still more preferably 700 to 900 μm. When the thickness of the plasticized polyvinyl acetal resin layer is in this range, excellent penetration resistance is likely to be obtained. The thickness is measured using, for example, a thickness gauge or a laser microscope.

When the laminate comprises the plasticized polyvinyl acetal resin layer, a difference between the amount of vinyl alcohol units of the polyvinyl acetal resin constituting the polyvinyl acetal resin film of the present invention and the amount of vinyl alcohol units of the polyvinyl acetal resin constituting the plasticized polyvinyl acetal resin layer is preferably 5% by mole or less, more preferably 3% by mole or less, particularly preferably 1% by mole or less. When the polyvinyl acetal resin constituting the polyvinyl acetal resin film of the present invention or the polyvinyl acetal resin constituting the plasticized polyvinyl acetal resin layer is composed of a mixture of plural resins, it is preferred that the average vinyl alcohol unit amount of the polyvinyl acetal resin constituting the polyvinyl acetal resin layer of the present invention and the average vinyl alcohol unit amount of the polyvinyl acetal resin constituting the plasticized polyvinyl acetal resin layer satisfy the above-described relationship. When the above-described difference is not larger than the above-described upper limit value, a difference in refractive index between the polyvinyl acetal resin film and the plasticized polyvinyl acetal resin layer in an equilibrium state after migration of the plasticizer in the laminate is small; therefore, when the plasticized polyvinyl acetal resin layer and the polyvinyl acetal resin film are used at different dimensions from each other, their boundary is hardly visible, which is preferred.

On the other hand, by increasing the difference between the amount of vinyl alcohol units of the polyvinyl acetal resin constituting the polyvinyl acetal resin film of the present invention and the amount of vinyl alcohol units of the polyvinyl acetal resin constituting the plasticized polyvinyl acetal resin layer, the plasticizer amount in the polyvinyl acetal resin film and the plasticizer amount in the plasticized polyvinyl acetal resin layer are made to be different from each other in an equilibrium state after migration of the plasticizer, whereby a laminate having excellent sound insulation performance can be obtained. In this case, the difference in the amount of vinyl alcohol units is preferably 5% by mole or larger, more preferably 8% by mole or larger.

The plasticized polyvinyl acetal resin layer may be a commercially available plasticized polyvinyl butyral sheet, a plasticized polyvinyl acetal resin layer in which nanoparticles having an infrared absorption or reflection capacity are dispersed, a colored plasticized polyvinyl acetal resin layer, or a plasticized polyvinyl acetal resin layer having a sound insulation function.

<Method of Producing Laminate>

The laminate can be produced by a method known to those of ordinary skill in the art. For example, on a transparent substrate, the polyvinyl acetal resin film or functional layer-equipped polyvinyl acetal resin film of the present invention and, if laminated, a plasticized polyvinyl acetal resin layer are arranged in any number of layers in any order, and another transparent substrate is further arranged thereon, after which the temperature is raised as a pre-thermocompression step so as to fuse the polyvinyl acetal resin film(s) and, if laminated, the plasticized polyvinyl acetal resin layer(s) onto the transparent substrate entirely or locally, and the resultant is subsequently treated in an autoclave, whereby the laminate can be produced. Alternatively, the laminate may be produced by preliminary bonding in advance the polyvinyl acetal resin film or functional layer-equipped polyvinyl acetal resin film of the present invention and, if laminated, those layers constituting the laminate other than transparent substrates such as a plasticized polyvinyl acetal resin layer, subsequently arranging the resultant between two transparent substrates, and then fusing them with each other at a high temperature.

In this process, the surface of the polyvinyl acetal resin film of the present invention that comes into contact with a transparent substrate is preferably the surface A, which is a rougher surface. By bringing the surface A into contact with the transparent substrate, degassing can be performed more easily at the time of bonding together the transparent substrate and the polyvinyl acetal resin film, so that foaming in the resulting laminate (laminated glass) can be inhibited.

The laminate of the present invention can be used as a laminated glass of a building or a vehicle. Therefore, the present invention also relates to a laminate which is a laminated glass for vehicles. The term "laminated glass for vehicles" used herein means a windshield glass, a rear glass, a roof glass, a side glass or the like for vehicles such as trains, trams, automobiles, ships, and aircraft.

In the present invention, when the laminate comprises a plasticized polyvinyl acetal resin layer adjacent to or in close contact with the polyvinyl acetal resin film, a plasticizer contained in the plasticized polyvinyl acetal resin layer usually migrates to a layer of the polyvinyl acetal resin film over time, and the amount of the plasticizer contained in the plasticized polyvinyl acetal resin layer becomes equal to the amount of the plasticizer contained in the layer of the polyvinyl acetal resin film. In the present invention, this average plasticizer amount is preferably 18 to 35% by mass, more preferably 20 to 30% by mass, particularly preferably 25 to 29% by mass. When the average plasticizer amount is in this range, a laminated glass having desired characteristics, such as reduction of impact on the head of a person in a vehicle upon collision, is likely to be obtained. The average plasticizer amount can be adjusted to be in the above-described range by controlling the amount of the plasticizer contained in the plasticized polyvinyl acetal resin layer, the thickness of the plasticized polyvinyl acetal resin layer, the amount of the plasticizer contained in the polyvinyl acetal resin film, and the thickness of the polyvinyl acetal resin film.

EXAMPLES

The present invention will now be described concretely by way of Examples and Comparative Examples; however, the present invention is not restricted to the below-described Examples. In the below-described Examples, unless otherwise specified, "%" means "% by mass".

(1) Polyvinyl Acetal Resin Materials

The formulations and physical properties of the polyvinyl acetal resins used in Examples and Comparative Examples are shown in Table 1.

TABLE 1

| Polyvinyl acetal resin | Amount of vinyl alcohol units (% by mole) | Acetalization Degree (% by mole) | Amount of vinyl acetate units (% by mole) | Viscosity of 10%-by-mass toluene/ethanol (1:1) solution (mPa · s) |
|---|---|---|---|---|
| A | 28.5 | 70.8 | 0.7 | 152 |
| B | 28.9 | 70.4 | 0.7 | 1,410 |

For the polyvinyl acetal resins A and B shown in Table 1, the viscosity was measured in accordance with the following method.

The polyvinyl acetal resins A and B were each added to and dissolved in a mixed solution of toluene and ethanol (1:1) at a concentration of 10% by mass, and the viscosity of the thus obtained solution was measured using a Brookfield-type (B-type) viscometer at 20° C. and 30 rpm.

Example 1

A polyvinyl acetal resin material was obtained by blending the polyvinyl acetal resins A and B shown in Table 1 at the mass ratio shown in Table 2. For the thus obtained polyvinyl acetal resin material, the viscosity of a 10%-by-mass toluene/ethanol (1:1, mass ratio) solution was measured in the same manner as in the above-described measurement of the viscosity of the polyvinyl acetal resins A and B. In addition, the peak-top molecular weight and the molecular weight distribution were measured or calculated in accordance with the below-described respective methods.

<Measurement of Peak-Top Molecular Weight and Molecular Weight Distribution of Polyvinyl Acetal Resin Materials>

The thus obtained resins for forming polyvinyl acetal resin films were each analyzed by GPC. For the GPC analysis, GPCmax TDA305 manufactured by Viscotek Corporation was used as an analyzer along with an RI detector; as columns, two SHODEX GPC KF-806 L columns, which were connected together and at one end of which was separately connected with a guard column SHODEX KF-G were used; a THF solvent and a standard polystyrene (EASICAL GPC/SEC Calibration Standards PS-1, manufactured by Agilent Technologies, Inc.) were used; and OmniSE, C4.7 was used as an analysis software. The measurement was performed at 40° C. with an injection amount of 100 μL, and the peak-top molecular weight and the molecular weight distribution of each of the above-described resins were determined. The results thereof are shown in Table 2.

The polyvinyl acetal resin material obtained by blending the polyvinyl acetal resins A and B was melt-kneaded, extruded in the form of a strand, and then pelletized. The thus obtained pellet was melt-extruded at 230° C. using a single screw extruder and a T-die. A film was formed using a metal elastic roll and a metal mirror-finished roll, whereby a 45 μm-thick polyvinyl acetal resin film 1 (hereinafter, may be simply referred to as "resin film 1") was obtained.

(2) Evaluation of Physical Properties/Characteristics of Polyvinyl Acetal Resin Film The surface physical properties of the thus obtained polyvinyl acetal resin film were measured in accordance with the below-described respective methods.

<Measurement of Mean Value Rz of 10-Point Average Roughness and Calculation of Standard Deviation>

The 10-point average roughness of the resin film 1 was measured in accordance with JIS B0601-1994 using SURFTEST SJ-310 manufactured by Mitutoyo Corporation (measurement force: 0.75 mN, stylus shape: tip radius=2 μmR, tip angle=60°).

Specifically, at an arbitrary spot on an arbitrary surface of the resin film 1, the first 10-point average roughness was measured. At a spot 5 cm away from the first measurement spot, the second 10-point average roughness was measured such that the measurement direction was parallel to that of the first measurement. Next, at a spot 5 cm away from the second measurement spot in the opposite direction from the first measurement spot, the third 10-point average roughness was measured such that the measurement direction was parallel to that of the second measurement. The fourth and the fifth 10-point average roughness values were also measured in the same manner, and the mean value and the standard deviation of the thus measured values were calculated. In the same manner, the 10-point average roughness was measured on the other surface of the resin film 1, and the mean value and the standard deviation thereof were calculated.

Of the thus calculated two mean values of the 10-point average roughness, a larger mean value was defined as Rz1(a), the standard deviation of the 10-point average roughness of this surface was defined as SD1, and a value obtained by dividing SD1 by Rz1(a) was calculated. Further, a smaller mean value of the 10-point average roughness was defined as Rz2(a), the standard deviation of the 10-point average roughness of this surface was defined as SD2, and a value obtained by dividing SD2 by Rz2(a) was calculated. The thus obtained values of Rz1(a), Rz2(a), SD1/Rz1(a), and SD2/Rz2(a) are shown in Table 2.

<Measurement of Mean Value Rz of 10-Point Average Roughness of Resin Film after Heating, and Calculation of Standard Deviation>

The resin film 1 cut into a size of 30 cm×30 cm was placed on a flat PET sheet and fixed at the four corners with a tape. This PET sheet was placed in an incubator heated to 50° C., left to stand for 30 minutes, and then taken out of the incubator. The 10-point average roughness was measured by the same method as described above, and the mean value of the 10-point average roughness of the surface whose mean value of the 10-point average roughness before the heat treatment was Rz1(a) was determined as Rz1(b), and the standard deviation thereof was determined as SD3, while the mean value of the 10-point average roughness of the surface whose mean value of the 10-point average roughness before the heat treatment was Rz2(a) was determined as Rz2(b), and the standard deviation thereof was determined as SD4. The values of Rz1(b), Rz2(b), SD3/Rz1(b), SD4/Rz2(b), Rz1(a)/Rz1(b), and Rz2(a)/Rz2(b) are shown in Table 2.

Example 2

A polyvinyl acetal resin film 2 was obtained by performing film formation in the same manner as in Example 1, except that the polyvinyl acetal resin B was not used as a polyvinyl acetal resin. For the thus obtained resin film 2, the physical properties of each surface were measured by the same methods as in Example 1. The results thereof are shown in Table 2.

Example 3

A polyvinyl acetal resin film 3 was obtained by performing film formation in the same manner as in Example 1, except that, as a plasticizer, 7.5 parts by mass of triethylene glycol di-2-ethylhexanoate (7% of a total amount of PVB resins and the plasticizer) was added with respect to a total of 100 parts by mass of the polyvinyl acetal resins. For the thus obtained resin film 3, the physical properties of each surface were measured by the same methods as in Example 1. The results thereof are shown in Table 2.

Examples 4 to 6

Polyvinyl acetal resin films 4, 5 and 6 were obtained by performing film formation in the same manner as in Example 1, except that sheet thickness was changed to 22 μm, 120 μm and 240 μm, respectively. For the thus obtained resin films 4 to 6, the physical properties of each surface were measured by the same methods as in Example 1. The results thereof are shown in Table 2.

Example 7

A polyvinyl acetal resin film 7 was obtained by performing film formation in the same manner as in Example 1, except that the metal elastic roll was changed to a rubber elastic roll. For the thus obtained resin film 7, the physical properties of each surface were measured by the same methods as in Example 1. The results thereof are shown in Table 2.

Example 8

A polyvinyl acetal resin film 8 was obtained by performing film formation in the same manner as in Example 1, except that the metal elastic roll was changed to an embossing roll 1. For the thus obtained resin film 8, the physical properties of each surface were measured by the same methods as in Example 1. The results thereof are shown in Table 2.

It is noted here that the embossing rolls 1 to 6 used in Examples 8 to 10 and Comparative Examples 2 to 5 are embossing rolls that are different from each other in terms of the mean value and the variation of surface irregularities.

Example 9

A polyvinyl acetal resin film 9 was obtained by performing film formation in the same manner as in Example 1, except that the metal elastic roll was changed to the embossing roll 2. For the thus obtained resin film 9, the physical properties of each surface were measured by the same methods as in Example 1. The results thereof are shown in Table 2.

Example 10

A polyvinyl acetal resin film 10 was obtained by performing film formation in the same manner as in Example 9, except that the metal mirror-finished roll was changed to the embossing roll 3. For the thus obtained resin film 10, the physical properties of each surface were measured by the same methods as in Example 1. The results thereof are shown in Table 2.

Example 11

A polyvinyl acetal resin film 11 was obtained by performing film formation in the same manner as in Example 2, except that, as a plasticizer, 8.7 parts by mass of triethylene glycol di-2-ethylhexanoate (8% of a total amount of PVB resins and the plasticizer) was added with respect to a total of 100 parts by mass of the polyvinyl acetal resins. For the thus obtained resin film 11, the physical properties of each surface were measured by the same methods as in Example 1. The results thereof are shown in Table 2.

Comparative Example 1

A comparative polyvinyl acetal resin film 1 was obtained by performing film formation in the same manner as in Example 1, except that the metal elastic roll was changed to a metal mirror-finished roll. For the thus obtained comparative resin film 1, the physical properties of each surface were measured by the same methods as in Example 1. The results thereof are shown in Table 2.

Comparative Example 2

A comparative polyvinyl acetal resin film 2 was obtained by performing film formation in the same manner as in Example 1, except that the metal elastic roll and the metal mirror-finished roll were both changed to the embossing roll 2. For the thus obtained comparative resin film 2, the physical properties of each surface were measured by the same methods as in Example 1. The results thereof are shown in Table 2.

Comparative Example 3

A comparative polyvinyl acetal resin film 3 was obtained by performing film formation in the same manner as in Example 1, except that the metal elastic roll was changed to the embossing roll 4. For the thus obtained comparative resin film 3, the physical properties of each surface were measured by the same methods as in Example 1. The results thereof are shown in Table 2.

Comparative Example 4

A comparative polyvinyl acetal resin film 4 was obtained by performing film formation in the same manner as in Example 1, except that the metal elastic roll was changed to the embossing roll 5. For the thus obtained comparative resin film 4, the physical properties of each surface were measured by the same methods as in Example 1. The results thereof are shown in Table 2.

Comparative Example 5

A comparative polyvinyl acetal resin film 5 was obtained by performing film formation in the same manner as in Comparative Example 3, except that the metal mirror-finished roll was changed to the embossing roll 6. For the thus obtained comparative resin film 5, the physical properties of each surface were measured by the same methods as in Example 1. The results thereof are shown in Table 2.

Comparative Example 6

A comparative resin film 6 was obtained by performing film formation in the same manner as in Example 1, except that the metal elastic roll was changed to a rubber elastic roll and the metal mirror-finished roll was changed to a rubber elastic roll. For the thus obtained comparative resin film 6, the physical properties of each surface were measured by the same methods as in Example 1. The results thereof are shown in Table 2.

TABLE 2

| | Polyvinyl acetal resin (100 parts) | | Plasticizer amound (%) | Viscosity of 10%-by-mass toluene/ethanol (1:1) solution (mPa·s) | Peak-top molectular weight | Molecular weight distribution Mw/Mn | Sheet thickness (μm) | Roll | | Surface roughness (before heat treatment) | |
|---|---|---|---|---|---|---|---|---|---|---|---|
| | A (%) | B (%) | | | | | | Rz1 surface | Rz2 surface | Rz1(a) (μm) | SD1/Rz1(a) |
| Example 1 | 77 | 23 | 0 | 253 | 130,100 | 2.9 | 45 | metal elastic roll | metal mirror-finished roll | 2.1 | 0.083 |
| Example 2 | 100 | 0 | 0 | 152 | 111,700 | 2.5 | 45 | metal elastic roll | metal mirror-finished roll | 3.2 | 0.13 |
| Example 3 | 77 | 23 | 7 | 253 | 130,100 | 2.9 | 45 | metal elastic roll | metal mirror-finished roll | 2.3 | 0.11 |
| Example 4 | 77 | 23 | 0 | 253 | 130,100 | 2.9 | 22 | metal elastic roll | metal mirror-finished roll | 2.3 | 0.12 |
| Example 5 | 77 | 23 | 0 | 253 | 130,100 | 2.9 | 120 | metal elastic roll | metal mirror-finished roll | 2 | 0.076 |
| Example 6 | 77 | 23 | 0 | 253 | 130,100 | 2.9 | 240 | metal elastic roll | metal mirror-finished roll | 1.8 | 0.066 |
| Example 7 | 77 | 23 | 0 | 253 | 130,100 | 2.9 | 45 | rubber elastic roll | metal mirror-finished roll | 4.2 | 0.18 |
| Example 8 | 77 | 23 | 0 | 253 | 130,100 | 2.9 | 45 | embossing roll 1 | metal mirror-finished roll | 1 | 0.13 |
| Example 9 | 77 | 23 | 0 | 253 | 130,100 | 2.9 | 45 | embossing roll 2 | metal mirror-finished roll | 1.6 | 0.14 |
| Example 10 | 77 | 23 | 0 | 253 | 130,100 | 2.9 | 45 | embossing roll 2 | embossing roll 3 | 1.7 | 0.15 |
| Example 11 | 100 | 0 | 8 | 152 | 111,700 | 2.5 | 45 | metal elastic roll | metal mirror-finished roll | 3.8 | 0.15 |
| Comparative Example 1 | 77 | 23 | 0 | 253 | 130,100 | 2.9 | 45 | metal mirror-finished roll | metal mirror-finished roll | 0.6 | 0.15 |
| Comparative Example 2 | 77 | 23 | 0 | 253 | 130,100 | 2.9 | 45 | embossing roll 2 | embossing roll 2 | 2.4 | 0.11 |
| Comparative Example 3 | 77 | 23 | 0 | 253 | 130,100 | 2.9 | 45 | embossing roll 4 | metal mirror-finished roll | 2.1 | 0.36 |
| Comparative Example 4 | 77 | 23 | 0 | 253 | 130,100 | 2.9 | 45 | embossing roll 5 | metal mirror-finished roll | 2.3 | 0.56 |
| Comparative Example 5 | 77 | 23 | 0 | 253 | 130,100 | 2.9 | 45 | embossing roll 4 | embossing roll 6 | 2.1 | 0.38 |
| Comparative Example 6 | 77 | 23 | 0 | 253 | 130,100 | 2.9 | 45 | rubber elastic roll | rubber elastic roll | 4.3 | 0.18 |

TABLE 2-continued

|  | Surface roughness (before heat treatment) | | | Surface (after 50° C. heat treatment) | | | | | | |
|---|---|---|---|---|---|---|---|---|---|---|
|  | Rz2(a) (μm) | SD2/ Rz2(a) | Rz1(a)/ Rz2(a) | Rz1(b) (μm) | SD3/ Rz1(b) | Rz2(b) (μm) | SD4/ Rz2(b) | Rz1(b)/ Rz2(b) | Rz1(a)/ Rz1(b) | Rz2(a)/ Rz2(b) |
| Example 1 | 0.8 | 0.038 | 2.63 | 2.1 | 0.085 | 0.9 | 0.041 | 2.33 | 1.00 | 0.89 |
| Example 2 | 0.7 | 0.038 | 4.57 | 3.2 | 0.13 | 0.7 | 0.034 | 4.57 | 1.00 | 1.00 |
| Example 3 | 1.4 | 0.045 | 1.64 | 2.1 | 0.12 | 1.3 | 0.050 | 1.62 | 1.10 | 1.08 |
| Example 4 | 1.4 | 0.034 | 1.64 | 2.3 | 0.13 | 1.4 | 0.036 | 1.64 | 1.00 | 1.00 |
| Example 5 | 0.6 | 0.034 | 3.33 | 2 | 0.056 | 0.6 | 0.033 | 3.33 | 1.00 | 1.00 |
| Example 6 | 0.3 | 0.026 | 6.00 | 1.7 | 0.081 | 0.3 | 0.017 | 5.67 | 1.06 | 1.00 |
| Example 7 | 0.6 | 0.033 | 7.00 | 4 | 0.21 | 0.6 | 0.043 | 6.67 | 1.05 | 1.00 |
| Example 8 | 0.6 | 0.040 | 1.67 | 0.9 | 0.14 | 0.6 | 0.056 | 1.50 | 1.11 | 1.00 |
| Example 9 | 0.8 | 0.047 | 2.00 | 1.5 | 0.14 | 0.8 | 0.042 | 1.88 | 1.07 | 1.00 |
| Example 10 | 1.3 | 0.12 | 1.31 | 1.6 | 0.14 | 1.2 | 0.10 | 1.33 | 1.06 | 1.08 |
| Example 11 | 0.7 | 0.041 | 5.43 | 2.4 | 0.13 | 0.7 | 0.040 | 3.43 | 0.63 | 1.00 |
| Comparative Example 1 | 0.6 | 0.14 | 1.00 | 0.6 | 0.13 | 0.6 | 0.15 | 1.00 | 1.00 | 1.00 |
| Comparative Example 2 | 2.3 | 0.12 | 1.04 | 2.2 | 0.13 | 2.2 | 0.12 | 1.00 | 1.09 | 1.05 |
| Comparative Example 3 | 0.8 | 0.040 | 2.63 | 2.1 | 0.38 | 0.7 | 0.056 | 3.00 | 1.00 | 1.14 |
| Comparative Example 4 | 0.8 | 0.041 | 2.88 | 2.3 | 0.52 | 0.8 | 0.047 | 2.88 | 1.00 | 1.00 |
| Comparative Example 5 | 0.9 | 0.48 | 2.33 | 2.1 | 0.41 | 0.8 | 0.47 | 2.63 | 1.00 | 1.13 |
| Comparative Example 6 | 3.8 | 0.13 | 1.13 | 4.3 | 0.18 | 3.8 | 0.13 | 1.13 | 1.00 | 1.00 |

(3) Evaluation of Properties of Polyvinyl Acetal Resin Film Rolls

The self-adhesion of the polyvinyl acetal resin films of Examples 1 to 11 and Comparative Examples 1 to 6 when each wound (laminated) in the form of a roll, and the adhesion and the removability of dust on the polyvinyl acetal resin film rolls of Examples 1 to 11 were evaluated in accordance with the following respective methods.

<Evaluation of Self-Adhesion>

On a core material having an outer diameter of 6 inches, each resin film of 10 m in length was wound with a tension of 50 N such that the surface having a mean value of the 10-point average roughness of Rz1(a) was on the inside, whereby a roll was produced. The thus obtained roll was maintained at 50° C. for 6 hours, and then left to stand for 24 hours at 23° C. and 50% RH. The roll was unwound by 10 rotations, and the unwound portion was cut and disposed, after which a test piece of 10 cm in length and 3 cm in width (a laminate formed of two superimposed resin films) was cut out from the remaining roll, and this test piece was peeled by hand to evaluate the self-adhesion. The evaluation criteria were as follows. The results thereof are shown in Table 3.

A: No self-adhesion occurred.
B: Self-adhesion occurred, but the resin films could be peeled off with hand.
C: Self-adhesion occurred, and the resin films could not be peeled off with hand, or deformation or breakage of the resin films was observed during peeling.

<Evaluation of Dust Adhesion and Dust Removability on Resin Film Rolls>

On a core material having an outer diameter of 6 inches, each resin film of 10 m in length was wound with a tension of 50 N such that the surface having a mean value of the 10-point average roughness of Rz1(a) was on the inside, whereby a roll (roll A) was produced. Further, on another core material having an outer diameter of 6 inches, each resin film of 10 m in length was wound with a tension of 50 N such that the surface having a mean value of the 10-point average roughness of Rz1(a) was on the outside, whereby a roll (roll B) was produced.

(Dust Adhesion)

The rolls A and B were each stored for 24 hours in a room having an air cleanliness classification of 6 as prescribed in JIS B9920(2002). Subsequently, the resin film existing on the outermost side of each roll was sampled, and the thus obtained sample was shaken by hand, after which a 1 mm×1 mm square region of the surface of this sample (the surface on the outside of each roll) was photographed at five arbitrary spots under a scanning electron microscope at a magnification of ×100 in both lengthwise and widthwise directions. On each of the thus obtained micrographs, the number of visually verifiable dust particles was counted, and the average count of the five spots (average count 1) was determined. The evaluation criteria were as follows. The results thereof are shown in Table 3.

A: The average count 1 was less than 2.
B: The average count 1 was 2 to less than 5.
C: The average count 1 was 5 or more.

(Dust Removability)

Further, after the above-described storage, the resin film existing on the outermost side of each roll was sampled, and the thus obtained sample was shaken by hand and then blown with air, after which a 1 mm×1 mm square region of the surface of this sample (the surface on the outside of each roll) was photographed at five arbitrary spots under a scanning electron microscope at a magnification of ×100 in both lengthwise and widthwise directions. On each of the thus obtained micrographs, the number of visually verifiable dust particles was counted, and the average count of the five spots (average count 2) was determined. The evaluation criteria were as follows. The results thereof are shown in Table 3.

A: A value obtained by dividing the average count 2 by the average count 1 was less than 0.2.
B: A value obtained by dividing the average count 2 by the average count 1 was 0.2 to less than 0.5.
C: A value obtained by dividing the average count 2 by the average count 1 was 0.5 or larger.

TABLE 3

|  | Polyvinyl acetal resin film | Self-adhesion | Roll A (Rz1 on inside) Dust adhesion | Roll A (Rz1 on inside) Dust removability | Roll B (Rz1 on outside) Dust adhesion | Roll B (Rz1 on outside) Dust removability |
|---|---|---|---|---|---|---|
| Example 1 | 1 | A | A | B | C | A |
| Example 2 | 2 | A | A | C | C | A |
| Example 3 | 3 | A | B | B | C | B |
| Example 4 | 4 | A | B | B | C | A |
| Example 5 | 5 | A | A | C | B | A |
| Example 6 | 6 | A | A | C | C | A |
| Example 7 | 7 | A | A | C | C | A |
| Example 8 | 8 | B | A | C | B | B |
| Example 9 | 9 | A | A | C | B | B |
| Example 10 | 10 | B | B | B | B | A |
| Example 11 | 11 | B | A | C | C | A |
| Comparative Example 1 | Comparative 1 | C | — | — | — | — |
| Comparative Example 2 | Comparative 2 | C | — | — | — | — |
| Comparative Example 3 | Comparative 3 | C | — | — | — | — |
| Comparative Example 4 | Comparative 4 | C | — | — | — | — |
| Comparative Example 5 | Comparative 5 | C | — | — | — | — |
| Comparative Example 6 | Comparative 6 | C | — | — | — | — |

The polyvinyl acetal resin films of Examples 1 to 11 according to the present invention exhibited an excellent self-adhesion inhibiting effect when wound and stored in the form of a roll. On the other hand, the polyvinyl acetal resin films of Comparative Examples 1 to 6, which did not satisfy the requirements of the present invention, were all confirmed to have a poor self-adhesion inhibiting effect during storage.

The invention claimed is:

1. A polyvinyl acetal resin film, comprising a polyvinyl acetal resin material,
wherein
the polyvinyl acetal resin material comprises a polyvinyl acetal resin and optionally plasticizer,
the polyvinyl acetal resin film has a thickness of from 5 to 350 μm, and satisfies Formulae (1) and (2):

$$Rz1(a) > 1.1 \times Rz2(a) \quad (1)$$

$$3 > Rz2(a) \quad (2),$$

where, comparing one surface and the other surface, a mean value of a 10-point average roughness of a rougher surface A and a mean value of a 10-point average roughness of a smoother surface B are defined as Rz1(a) μm and Rz2(a) μm, respectively and
a value obtained by dividing a standard deviation of the 10-point average roughness of the rougher surface A by Rz1 (a) and a value obtained by dividing a standard deviation of the 10-point average roughness of the smoother surface B by Rz2(a) are each from 0 to 0.30,
a viscosity of a toluene/ethanol (1:1, mass ratio) solution containing 10%-by-mass of the polyvinyl acetal resin, which is measured at 20° C. and 30 rpm using a Brookfield-type viscometer, is from 100 to 1,000 mPas, and
the polyvinyl acetal resin film comprises the plasticizer in an amount of from 0 to 20% by mass based on a total mass of the polyvinyl acetal resin film.

2. The polyvinyl acetal resin film according to claim 1, further satisfying Formula (3):

$$Rz1(a) < 5 \quad (3).$$

3. The polyvinyl acetal resin film according to claim 1, further satisfying Formulae (4), (5) and (6):

$$0.7 \times Rz1(a) \leq Rz1(b) \leq 1.3 \times Rz1(a) \quad (4)$$

$$0.7 \times Rz2(a) \leq Rz2(b) \leq 1.3 \times Rz2(a) \quad (5)$$

$$Rz1(b) > Rz2(b) \quad (6)$$

where the mean value of the $_{10}$-point average roughness of the rougher surface A and the mean value of the 10-point average roughness of the smoother surface B after the polyvinyl acetal resin film is maintained at 50° C. for 30 minutes are defined as Rz1 (b) μm and Rz2(b) μm, respectively.

4. The polyvinyl acetal resin film according to claim 1, wherein the viscosity of the toluene/ethanol (1:1, mass ratio) solution containing 10%-by-mass of the polyvinyl acetal resin is 300 mPas or lower.

5. The polyvinyl acetal resin film according to claim 1, wherein the viscosity of the toluene/ethanol (1:1, mass ratio) solution containing 10%-by-mass of the polyvinyl acetal resin is higher than 200 mPas.

6. The polyvinyl acetal resin film according to claim 1, wherein the polyvinyl acetal resin has a molecular weight distribution of 2.7 or higher.

7. The polyvinyl acetal resin film according to claim 1, wherein the polyvinyl acetal resin is a mixture of at least two polyvinyl acetal resins having different viscosity-average polymerization degrees, or an acetalized product of a mixture of at least two polyvinyl alcohol-based resins having different viscosity-average polymerization degrees.

8. A polyvinyl acetal resin film roll, comprising the polyvinyl acetal resin film according to claim 1 which is wound such that the rougher surface A side is on the inside.

9. A polyvinyl acetal resin film roll, comprising the polyvinyl acetal resin film according to claim 1 which is wound such that the rougher surface A side is on the outside.

10. A method of storing a polyvinyl acetal resin film roll, the method comprising:
storing the polyvinyl acetal resin film roll according to claim 8 at a temperature of from −20° C. to 60° C.

11. A functional layer-equipped polyvinyl acetal resin film, comprising a functional layer on at least one surface of the polyvinyl acetal resin film according to claim 1.

12. The functional layer-equipped polyvinyl acetal resin film according to claim 11, wherein the functional layer is a conductive layer.

13. The functional layer-equipped polyvinyl acetal resin film according to claim 12, wherein a material constituting the conductive layer comprises silver or copper.

14. The functional layer-equipped polyvinyl acetal resin film according to claim 12, wherein the conductive layer comprises plural linear conductive materials having a line width of from 1 to 30 μm.

15. A method of producing the functional layer-equipped polyvinyl acetal resin film according to claim 11, the method comprising:
coating, printing, or laminating a material constituting the functional layer on at least one surface of the polyvinyl acetal resin film.

16. A laminate, comprising:
a transparent substrate; and
the polyvinyl acetal resin film according to claim 1.

17. A laminate, comprising the polyvinyl acetal resin film according to claim 1 between plural transparent substrates.

18. The laminate according to claim 16, further comprising a plasticized polyvinyl acetal resin layer.

19. The laminate according to claim 16, wherein the transparent substrate is a glass.

20. A vehicle, comprising: a glass comprising the laminate according to claim 16.

\* \* \* \* \*